US008072859B2

(12) United States Patent
Kaida et al.

(10) Patent No.: US 8,072,859 B2
(45) Date of Patent: Dec. 6, 2011

(54) OPTICAL DISC, RECORDING APPARATUS, READING APPARATUS, RECORDING METHOD AND READING METHOD

(75) Inventors: Masaru Kaida, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 819 days.

(21) Appl. No.: 10/582,760

(22) PCT Filed: Jan. 13, 2006

(86) PCT No.: PCT/JP2006/300379
§ 371 (c)(1), (2), (4) Date: Apr. 30, 2008

(87) PCT Pub. No.: WO2006/075707
PCT Pub. Date: Jul. 20, 2006

(65) Prior Publication Data

US 2009/0034382 A1 Feb. 5, 2009

(30) Foreign Application Priority Data

Jan. 14, 2005 (JP) ................................ 2005-007413

(51) Int. Cl.
*G11B 20/18* (2006.01)

(52) U.S. Cl. ................... 369/53.17; 369/47.14; 714/710

(58) Field of Classification Search ............... 369/53.17; 714/710
See application file for complete search history.

(56) References Cited

U.S. PATENT DOCUMENTS 5,319,626 A 6/1994 Ozaki et al.
5,442,614 A 8/1995 Tamegai
7,203,139 B2 * 4/2007 Terada et al. .............. 369/47.14
7,233,550 B2 * 6/2007 Park et al. .................. 369/47.14
7,355,934 B2 4/2008 Park et al.
7,379,402 B2 5/2008 Ko et al.
7,397,743 B2 * 7/2008 Lee et al. ................... 369/53.17
7,483,349 B2 * 1/2009 Park et al. .................. 369/47.14
7,532,551 B2 5/2009 Park et al.
7,630,283 B2 * 12/2009 Park et al. .................. 369/53.17
7,710,841 B2 * 5/2010 Hwang et al. .............. 369/47.14
2004/0071056 A1 4/2004 Park et al.

(Continued)

FOREIGN PATENT DOCUMENTS

EP 0 490 400 6/1992

(Continued)

OTHER PUBLICATIONS

European Search Report, Application No. EP10 00 4067.4-2223 dated Aug. 5, 2010.

*Primary Examiner* — Aristotelis Psitos
(74) *Attorney, Agent, or Firm* — Panasonic Patent Center; Dhiren Odedra; Kerry Culpepper

(57) ABSTRACT

An optical disc 1 includes a defect management area (DMA). A plurality of defective area lists (TDFLs) and structure information (TDDS) are recorded in a temporary defect management area (TDMS) of the defect management area (DMA). The defective area lists (TDFLs) indicate at least one defective area which was detected during an access to the optical disc 1. The structure information (TDDS) includes a plurality of pieces of position information that indicate positions of the defective area lists (TDFLs). The plurality of pieces of position information, corresponding one-to-one to the defective area lists, are arranged in the structure information (TDDS) in an order in which the defective area lists (TDFLs) corresponding thereto are read out.

8 Claims, 22 Drawing Sheets

U.S. PATENT DOCUMENTS

| | | | |
|---|---|---|---|
| 2004/0145980 | A1 | 7/2004 | Park et al. |
| 2004/0223440 | A1 | 11/2004 | Park |
| 2005/0169132 | A1 | 8/2005 | Kuraoka et al. |

FOREIGN PATENT DOCUMENTS

| | | |
|---|---|---|
| JP | 4-216369 | 8/1992 |
| JP | 5-6626 | 1/1993 |
| JP | 2671656 | 1/1993 |
| JP | 7-147065 | 6/1995 |
| JP | 9-167446 | 6/1997 |
| WO | 2004/034396 | 4/2004 |
| WO | WO 2004/036561 A1 | 4/2004 |
| WO | 2005/038779 | 4/2005 |

* cited by examiner

CONTROL MEMORY
23
1st DMA
2nd DMA
3rd DMA
4th DMA
TDFL #1
TDFL #2
TDFL #3
TDFL #4
TDDS
TDMS#j
SPARE AREA
USER DATA AREA
LEAD-IN AREA
DATA AREA
LEAD-OUT AREA
DDS
DFL #1
DFL #2
DFL #3
DFL #4

OPTICAL DISC, RECORDING APPARATUS, READING APPARATUS, RECORDING METHOD AND READING METHOD

TECHNICAL FIELD

The present invention relates to a technical field including a technology for temporarily recording defect entries.

BACKGROUND ART

The defect entry is information that correlates positions of defective clusters with positions of substitute sectors that are used in place of the defective clusters.

The temporarily recording of the defect entry is a process in which when a defective area is detected while data is recorded onto a write-once optical disc, a defect entry concerning the defective area is recorded into a temporary area. The reason why it is necessary to temporarily write the defect entry is as follows. In the optical disc, an area called Defect Management Area (DMA) for writing defect entries therein is preliminarily provided. However, it is not allowed in a write-once optical disc to write a defect entry into the DMA until the finalize process is performed. This is because once data is written onto a write-once optical disc, it is impossible to rewrite the data later. That is to say, once a defect entry concerning a defective area is written to the DMA, it is impossible to add or update data in the DMA even if another defective area is detected thereafter. For this reason, when a defective area is detected during a recording process, it is necessary to write a defect entry concerning the defective area into a temporary defect management area, or the Temporary Disc Management Structure (TDMS).

The document indicated below discloses, as a prior art, a technology for writing the temporary defective area list, or the Temporary DeFect List (herein after, TDFL) that includes a plurality of defect entries concerning defective areas.

Document 1: Japanese Patent No. 2671656 (FIGS. 3-6)

DISCLOSURE OF THE INVENTION

The Problems the Invention is Going to Solve

In the DMA, a plurality of defective area lists are arranged such that the addresses of defective areas indicated by the defective area lists are arranged sequentially in the ascending order. With such arrangement, if the data is read optically from the optical disc in order from the inner circumference to the outer circumference, the plurality of defective area lists are read out onto the memory in the ascending order of the addresses of the defective areas indicated by the defective area lists. The firmware of the drive apparatus performs a process using the defective area lists on presumption that the defective area lists are arranged in the above-mentioned order on the memory. The firmware of the drive apparatus requires the defective area lists to be provided in the above-mentioned order since it is primitive software for controlling what is called the physical layer.

The defective area lists recorded in the TDMS have the same properties as the defective area lists recorded in the DMA, and therefore need to be read and arranged onto the memory in the ascending order of the addresses of the defective areas indicated by the defective area lists. Otherwise, the firmware would fail to process the defective area lists normally.

For the reasons stated above, the defective area lists recorded in the TDMS of a conventional optical disc are arranged sequentially in the ascending order of the addresses of the defective areas indicated by the defective area lists. However, this requirement of arranging the defective area lists in the ascending order of the addresses of the defective areas ruins the freedom in arranging the defective area lists in conventional optical discs. With such a lack of freedom, if a defective cluster is detected in the middle of recording a plurality of defective area lists, the plurality of defective area lists cannot be record-d discretely, but all of them must be re-recorded in the clusters succeeding the defective cluster.

As described above, since all the defective area lists should be re-recorded in clusters after a defective cluster, the areas allocated to the TDMS are consumed rapidly.

FIG. 1 shows how the process is carried out when a defective cluster is detected while a plurality of defective area lists are written. The first row of FIG. 1 represents a plurality of clusters that constitute TDMS#j. The drawing shows a plurality of temporary defective area lists. Among the clusters constituting the TDMS in the first row, cluster#2 is a defective cluster. The second row indicates the state in which TDFL#1 has been written in cluster#1, and the third row indicates the state in which TDFL#2 failed to be written into cluster#2. According to a conventional technology, TDFL#1 to TDFL#4 should be arranged sequentially. As a result, TDFL#1 to TDFL#4 and Temporary Disc Definition Structure (TDDS) are written in cluster#3 and the succeeding clusters as a retry. The TDDS is information that indicates the position of the first TDFL (address C3 in FIG. 1) among TDFL#1 to TDFL#4. The fourth to seventh rows show processes in which TDFL#1 to TDFL#4 and TDDS are written in cluster#3 and the succeeding clusters.

Here, the TDMS is assigned to a specific area called the lead-in area, on the optical disc. Accordingly, such a conventional arrangement of TDFLs, which requires that if a defective cluster is detected, all of a set of defective area lists should be re-recorded in the clusters after the defective cluster, has a problem that the areas allocated to the TDMS are consumed rapidly.

It is therefore an object of the present invention to provide an optical disc that enables a plurality of defective area lists to be readout onto the memory in a predetermined order, but prevents the temporary defect management area (TDMS) from being consumed rapidly.

Means to Solve the Problems

The above-mentioned object of the present invention is achieved by a write-once optical disc onto which data is recorded in units of clusters, the write-once optical disc including a temporary defect management area, wherein one or more structures for updating defect management are recorded in the temporary defect management area, and each structure performs update separately, each of the structures includes at least one not-defective cluster in which a defective area list and structure information are included, the defective area list includes entries for one or more defective areas in the optical disc, the entries in the defective area list of each structure have been sorted in accordance with information of defective areas, the structure information is arranged in a last cluster of each structure, and the structure information includes a plurality of pieces of position information that indicate positions of clusters each of which includes a part of the defective area list.

Effects of the Invention

With the above-described construction of the optical disc of the present invention in which the entries in the defective area list of each structure have been sorted in accordance with information of defective areas, and the structure information includes a plurality of pieces of position information which each indicate a position of a defective area list whose entries have been sorted, even if the defective area list is arranged discretely in the temporary defect management area, the defective area list is read out onto the memory based on the plurality of pieces of position information in the structure information, so that the entries in the defective area list are arranged in the memory in the same order as have been sorted preliminarily.

There is no need to arrange the defective area list sequentially even if the temporary defect management area includes a defective cluster. The defective area list can be arranged in discrete sequential areas including the defective cluster. That is to say, a random arrangement of the defective area list is possible.

With the above-stated construction, the defective area list can be arranged randomly even if the temporary defect management area includes a defective cluster. Accordingly, with the above-stated construction, when a defective area list is to be written in a sequence of clusters including a defective cluster, only part of the defective area list needs to be written as a retry, instead of all of the defective area list. As understood from this, the construction of the present invention prevents the temporary defect management area (TDMS) from being consumed rapidly since it reduces the defective area list to be written in a retry.

With such a construction in which defective area list need not to be written sequentially in order into a defective cluster and the succeeding clusters, the freedom in arranging the defective area list is increased.

DESCRIPTION OF CHARACTERS

Figure 1:
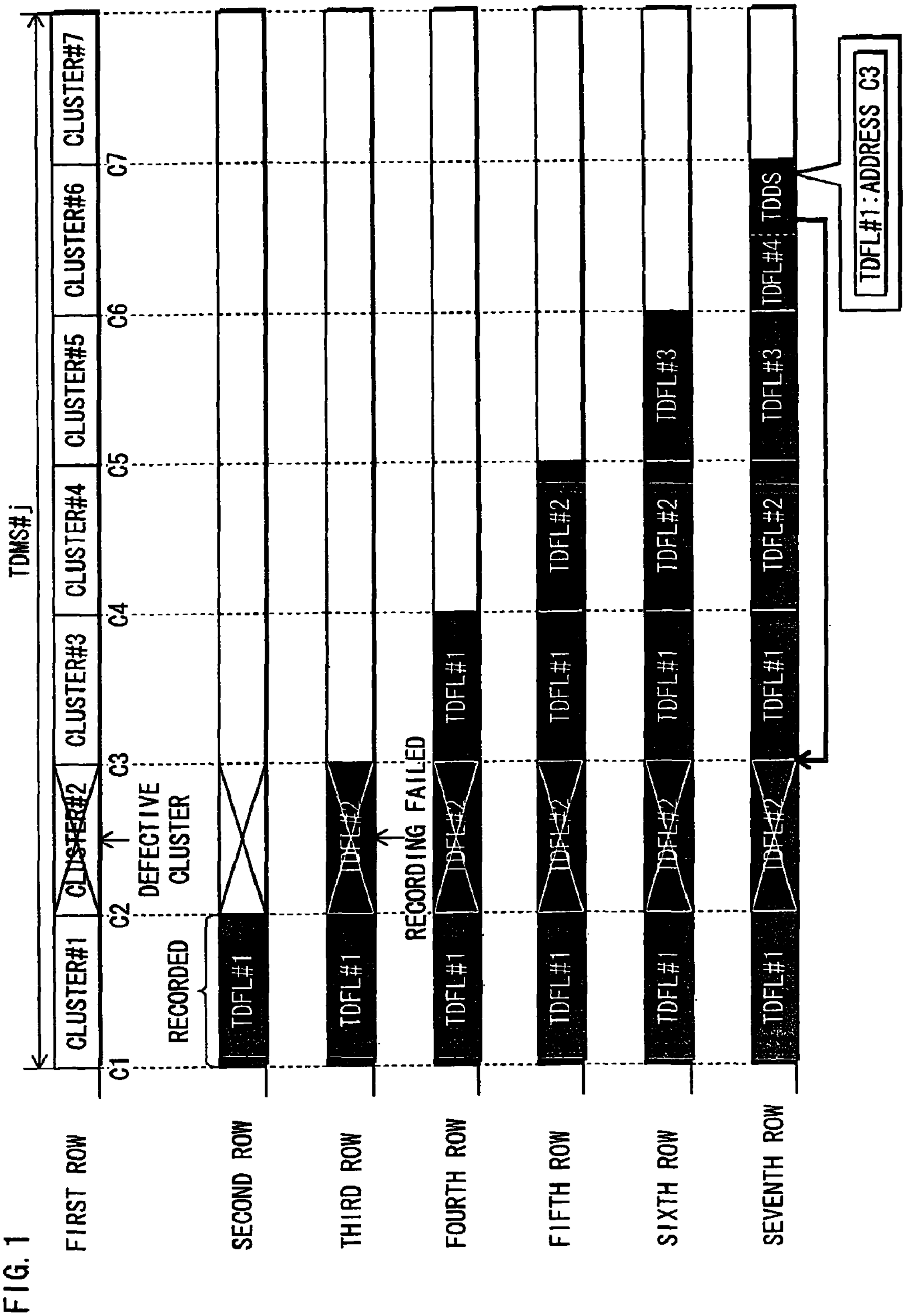
FIG. 1 shows how the process is carried out when a defective cluster is detected while a set of defective area lists is written.

1 optical disc
2 lead-in area
3 data area
4 lead-out area
5 spare area
6 user data area
7 spare area
11 BD-R drive
12 instruction processing unit
13 defect management information processing unit
14 reproduction control unit
15 recording control unit
16 storage buffer
21 DMA information reading unit
22 TDMS information reading unit
23 control memory
24 defect entry adding unit
25 TDFL conversion unit
26 TDMS information writing unit
27 verifying unit
28 position information generating unit
29 DMA information writing unit
100 recording/reading apparatus
200 high-order control apparatus

BEST MODE FOR CARRYING OUT THE INVENTION

Figure 2A:
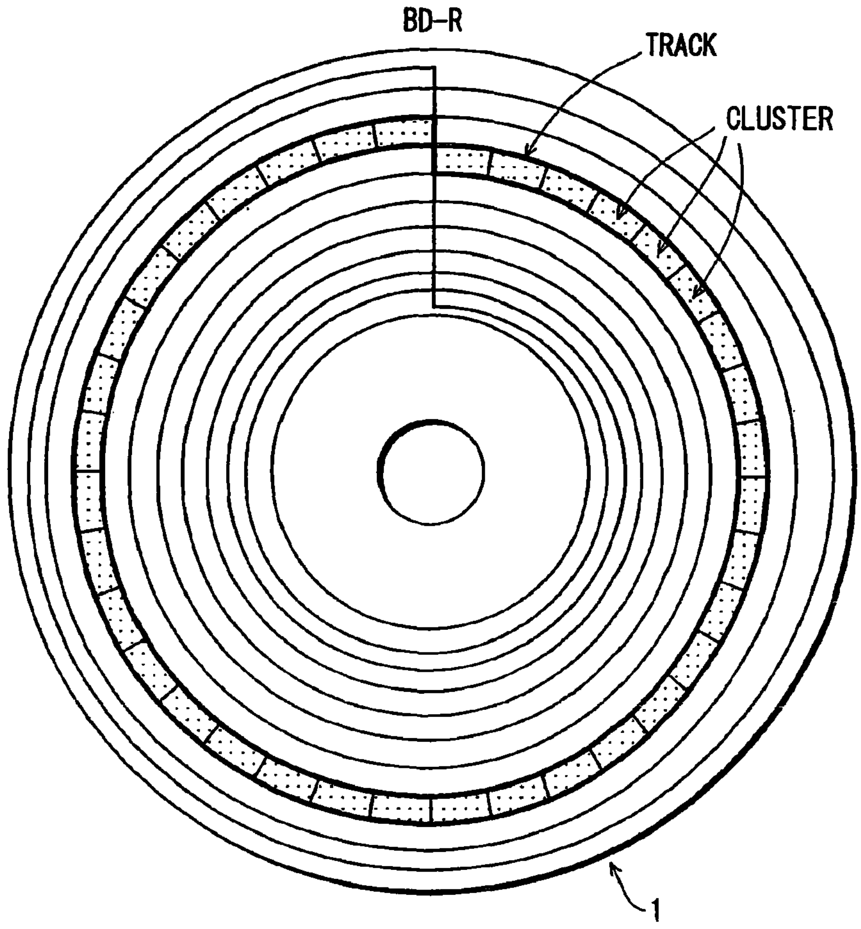
FIG. 2A shows the overall structure of the optical disc.

Here will be described an embodiment of the optical disc of the present invention. FIG. 2A shows the overall structure of the optical disc. Optical disc 1 is a large-capacity BD-R for which blue laser is used, and has a large number of tracks formed spirally thereon. Each track is divided into a plurality of clusters.

Figure 2B:
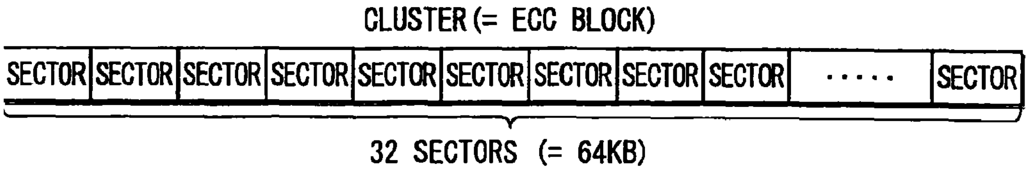
FIG. 2B shows the internal structure of the cluster.

FIG. 2B shows the internal structure of the cluster. Each cluster is a set of sectors for error correction, and is also called an error correction block. The error correction is made in units of clusters. Accordingly, recording or reproduction is performed using the cluster as the minimum unit. As shown in FIG. 2B, each cluster is composed of 32 sectors, and is 64 KB in size.

Figure 3:
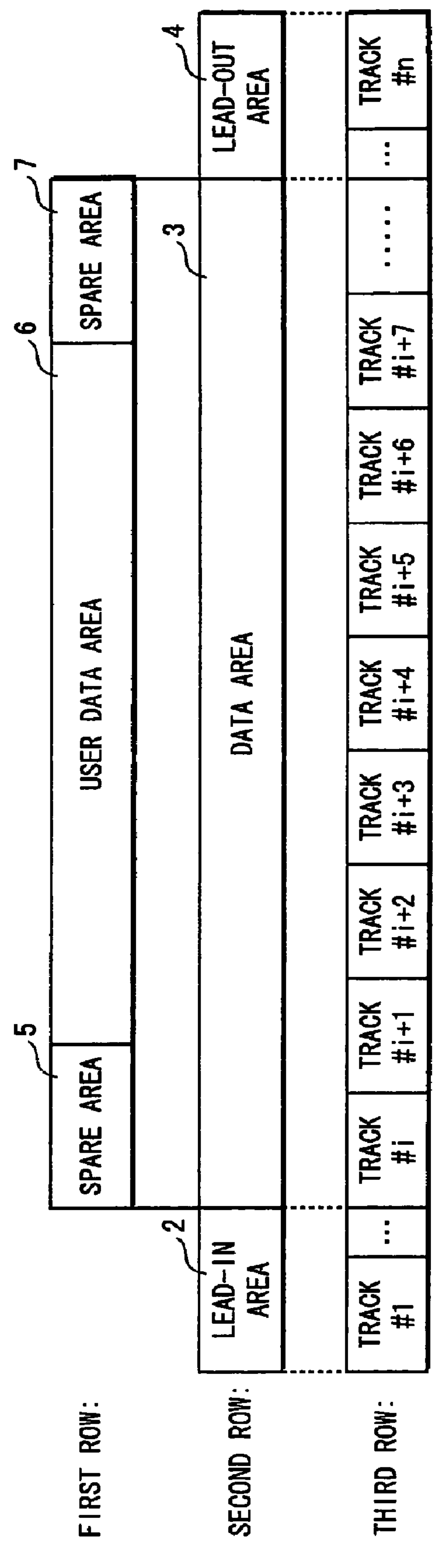
FIG. 3 shows tracks in the state where they are horizontally extended though they are in reality formed spirally on the optical disc 1.

FIG. 3 shows tracks in the state where they are horizontally extended though they are in reality formed spirally on the optical disc 1. The third row of FIG. 3 shows the horizontally extended tracks, and the second row shows a lead-in area 2, a data area 3, and a lead-out area 4 that are formed on the tracks.

The lead-in area 2 stores control information referred to by an apparatus, and plays a role of "supplementary area" so that if the optical head overruns when trying to access a track at the edge of the data area 3, the optical head can follow the track.

The data area 3 is a substantial portion of the optical disc.

The lead-out area 4 stores control information referred to by an apparatus, and plays a role of "supplementary area" so that if the optical head, trying to access a track at the edge of the data area 3, overruns, it can follow the track.

The first row of FIG. 3 shows the internal structure of the data area 3. As shown in the first row, the data area 3 includes two spare areas, 5 and 7, and a user data area 6.

The user data area 6 is an area into which the user can store information he/she likes to, including real-time data such as music or video, text, and computer data such as a database.

The spare areas 5 and 7 are substitute areas which are used to record data in place of a defective cluster that may be detected in the user data area 6.

<Internal Structure of Lead-in Area 2>

Figure 4A:
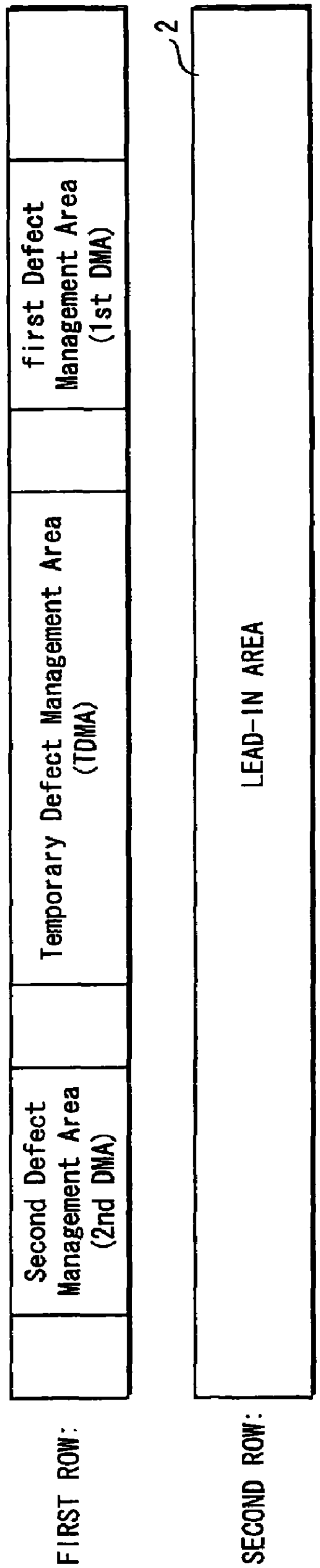
FIG. 4A shows the internal structure of the lead-in area 2.

FIG. 4A shows the internal structure of the lead-in area 2. The second row of FIG. 4A shows the lead-in area 2 as a whole, and the first row shows the internal structure of the lead-in area 2. As shown in the first row, the lead-in area 2 includes the First Defect Management Area (herein after $1^{st}$ DMA), Second Defect Management Area (herein after $2^{nd}$ DMA), and Temporary Defect Management Area (herein after TDMA). The $1^{st}$ DMA and the $2^{nd}$ DMA are areas used for managing the information of defective clusters in the optical disc 1.

<Internal Structure of Lead-Out Area 4>

Figure 4B:
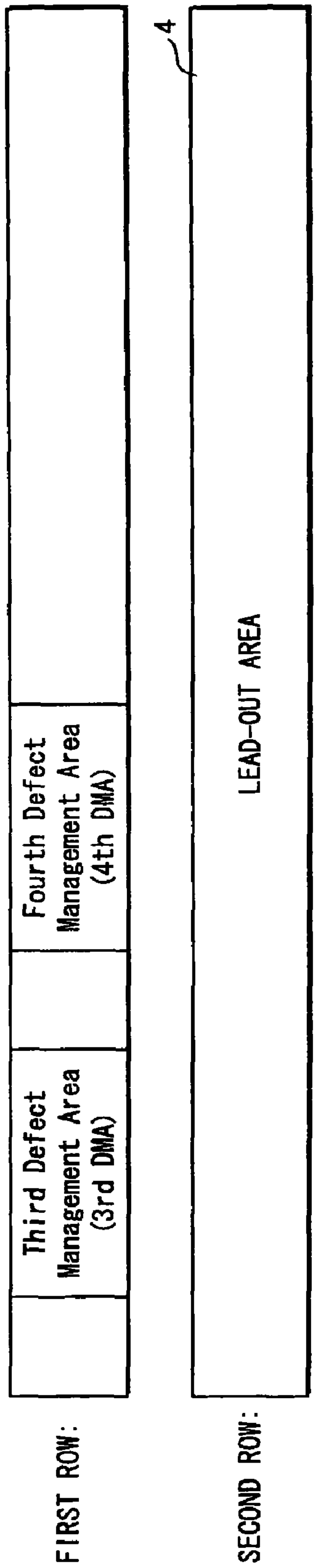
FIG. 4B shows the internal structure of the lead-out area 4.

FIG. 4B shows the internal structure of the lead-out area 4. The second row of FIG. 4B shows the lead-out area 4 as a whole, and the first row shows the internal structure of the lead-out area 4. As shown in the first row, the lead-out area 4 includes Third Defect Management Area (herein after $3^{rd}$ DMA) and Fourth Defect Management Area (herein after $4^{th}$ DMA). The $3^{rd}$ DMA and the $4^{th}$ DMA are areas used for managing the information of defective clusters in the optical disc 1.

The $1^{st}$ DMA to the $4^{th}$ DMA are respectively disposed at predetermined positions, and are variable in size, varying depending on the number of defective clusters.

Figure 5A:
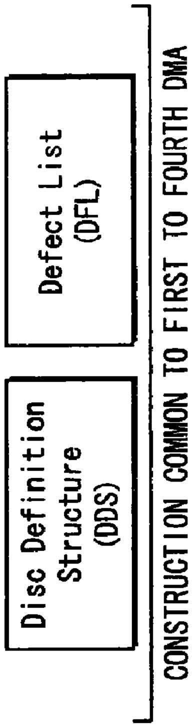
FIG. 5A shows a common structure of the 1$^{st}$ DMA to the 4$^{th}$ DMA.

The $1^{st}$ DMA to the $4^{th}$ DMA have a common structure, as shown in FIG. 5A. Each DMA includes Disc Definition Structure (herein after, DDS) and a defective area list, or DeFect List (herein after, DFL). They are arranged such that the DDS is followed by the DFL.

<Data Structure of DFL>

Figure 5B:
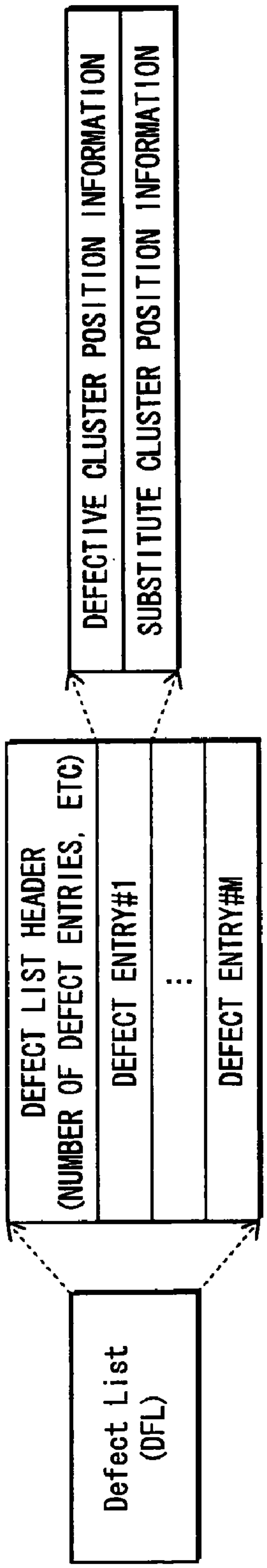
FIG. 5B shows the data structure of the DFL.

FIG. 5B shows the data structure of the DFL.

The DFL includes a defect list header and defect entry #1 to defect entry #M, where the number of the defect entries included therein ranges from 0 to M.

The defect list header contains information such as the number of defect entries included in the DFL.

Each of the defect entries #1 to #M includes "defective cluster start position information" which shows the start position of a defective cluster detected during an access to the user data area 6, and also includes "substitute cluster position information" which shows the position of a cluster in the spare area 5 or 7 used in place of the defective cluster.

<Data Structure of DDS>

Figure 5C:
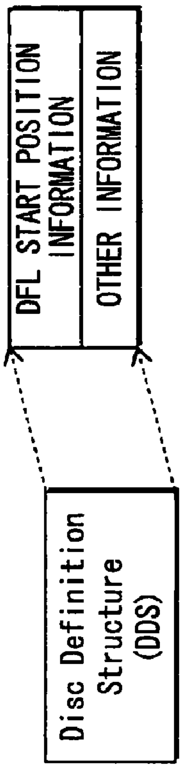
FIG. 5C shows the data structure of the DDS.

FIG. 5C shows the data structure of the DDS. The DDS includes "DFL start position information (DFL pointer)" which shows the position of the first DFL among one or more DFLs in each DMA, and also includes "other information". Since the DDS indicates the DFL starting position, it is possible to read the DFLs in each DMA by accessing the DDS.

The $1^{st}$ DMA to the $4^{th}$ DMA need to contain the same information, except for the starting position information of the DFL. Each of the $1^{st}$ DMA to the $4^{th}$ DMA is composed of 32 clusters, among which the first four clusters are used for DDS, and four DDSs are recorded therein repeatedly. The succeeding 28 clusters are used for DFL, and are used in units of four clusters. More specifically, first the four clusters 5-8 are used, then if they become unassured, the next four clusters 9-12 are used, and so on. Up to now, DFL and DDS have been described.

<TDMA>

Here, TDMA will be described. The TDMA is an area for temporarily recording defect entries that have been generated before the finalize process is performed. The TDMA is unique to write-once optical discs, and is not provided in the read-only optical discs (BD-ROM) or rewritable optical discs (BD-RE).

The finalize process is a process in which a write-once optical disc is modified in data structure so as to be compatible with a rewritable optical disc (herein after, performing the finalize process for an optical disc may also be referred to as finalizing the optical disc).

The technical significance of having the TDMA in the lead-in area 5 is as follows. In the case of a rewritable optical disc, the $1^{st}$ DMA to the $4^{th}$ DMA can be rewritten, and it is possible to write, into the $1^{st}$ DMA to the $4^{th}$ DMA, a defect entry concerning a defective area that was detected most recently, and rewrite the defect entry repeatedly as necessary. It is therefore possible to cause the $1^{st}$ DMA to the $4^{th}$ DMA to have information concerning the defective area that was detected most recently.

However, in the case of a write-once optical disc, data can be recorded into the $1^{st}$ DMA to the $4^{th}$ DMA only once. It is therefore impossible for the write-once optical disc to cause the $1^{st}$ DMA to the $4^{th}$ DMA to have information concerning the defective area that was detected most recently. Accordingly, write-once optical discs are provided with the TDMA so as to be compatible with rewritable optical discs.

<Internal Structure of TDMA>

Figure 6:
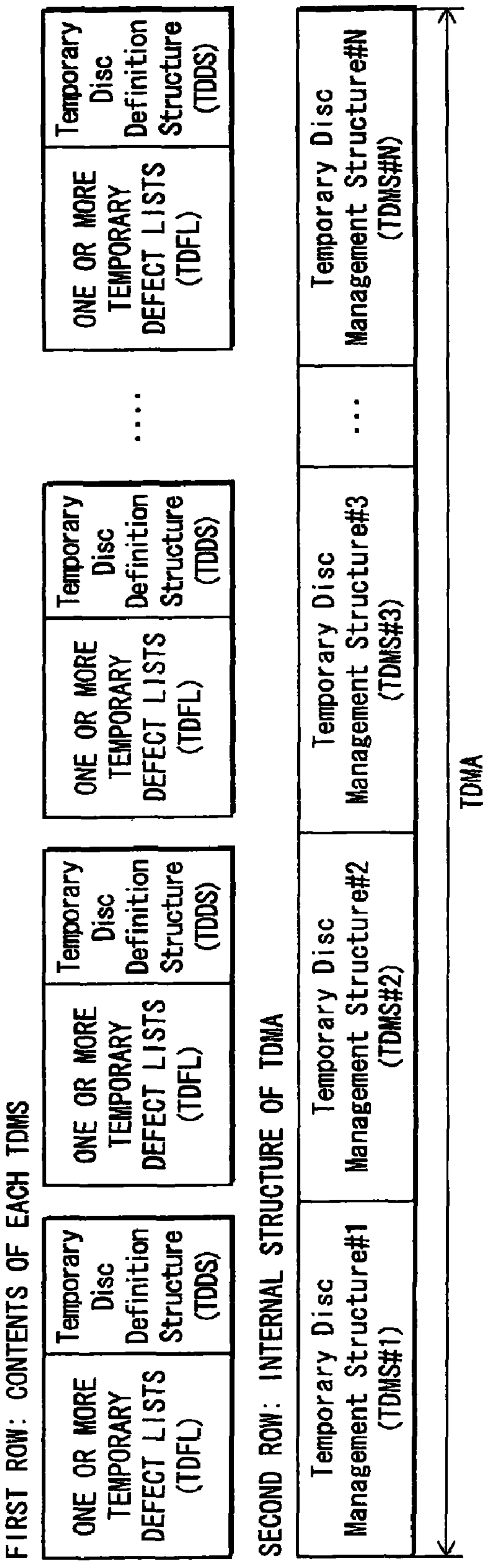
FIG. 6 shows the structure of a TDMA.

FIG. 6 shows the structure of a TDMA. The second row of FIG. 6 shows the internal structure of the TDMA. As shown in the second row, the TDMA includes the N number of TDMSs (TDMS#1, TDMS#2, TDMS#3, . . . TDMS#N). The N number of TDMSs are areas into which information (defect entries), which concerns defective areas that are detected while data is recorded into the user data area, is written such that a defect entry concerning a defective area detected firstly is written in the first TDMS (TDMS#1), a defect entry concerning a defective area detected secondly is written in the second TDMS (TDMS#2), . . . a defect entry concerning a defective area detected Nthly is written in the $N^{th}$ TDMS (TDMS#N).

The later written a defect entry is, the larger number a TDMS has, and only a TDMS with the largest number is made valid (herein after, the valid TDMS may also be referred to as the latest TDMS). When the optical disc 1 is accessed, only the TDMS with the largest number among those having defect entries is referred to. In the finalize process, only the defect entry written in the latest TDMS is written into the $1^{st}$ DMA to the $4^{th}$ DMA.

The TDMSs have a common structure. That is to say, as shown in the first row of FIG. 6, each TDMS includes one or more temporary defective area lists, or one or more Temporary DeFect Lists (herein after, TDFLs) and Temporary Disc Definition Structure (herein after, TDDS). They are arranged such that the TDFLs are followed by the TDDS.

The TDMS is structured in units of clusters, and is variable in size, varying depending on the number of defective entries. Each TDMS is thus composed of one or more clusters. When a TDMS is composed of one cluster, a TDFL and a TDDS are included in the cluster. When a TDMS is composed of a plurality of clusters, a TDFL and a TDDS are stored in a cluster at the end of the TDMS, and only TDFLs are stored in the other clusters.

<Data Structure of DFL>

Figure 7A:
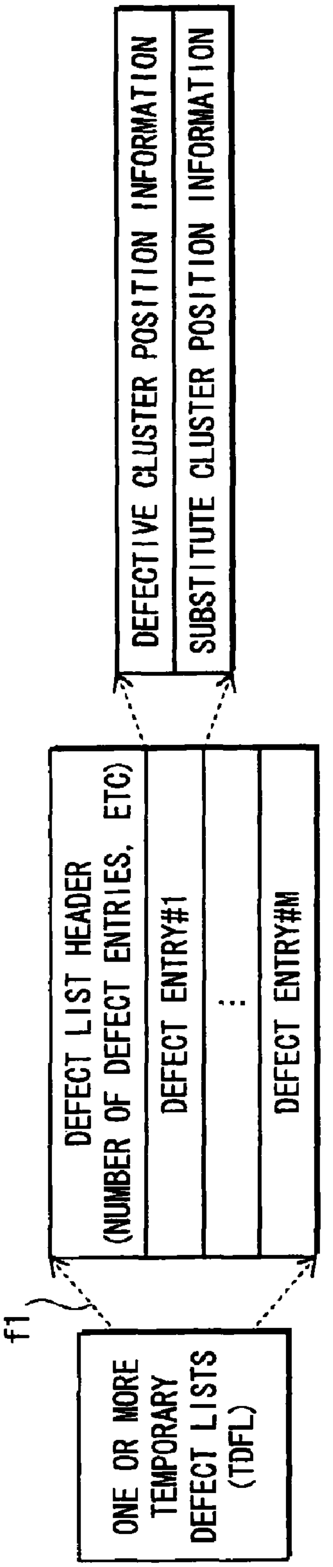
FIG. 7A shows the data structure of the TDFL.

FIG. 7A shows the data structure of the TDFL.

The TDFL has the same structure as the DFL. As indicated by the lead f1, the TDFL includes a defect list header and defect entry #1 to defect entry #M, where the number of the defect entries included therein ranges from 0 to M.

The defect list header contains such information as the number of defect entries included in the TDFL.

Each of the defect entries #1 to #M includes "defective cluster position information" which shows the position of a defective cluster detected during an access to the user data area 6, and also includes "substitute cluster position information" which shows the position of a cluster in a spare area 5 or 7 used in place of the defective cluster.

<Data Structure of TDDS>

Figure 7B:
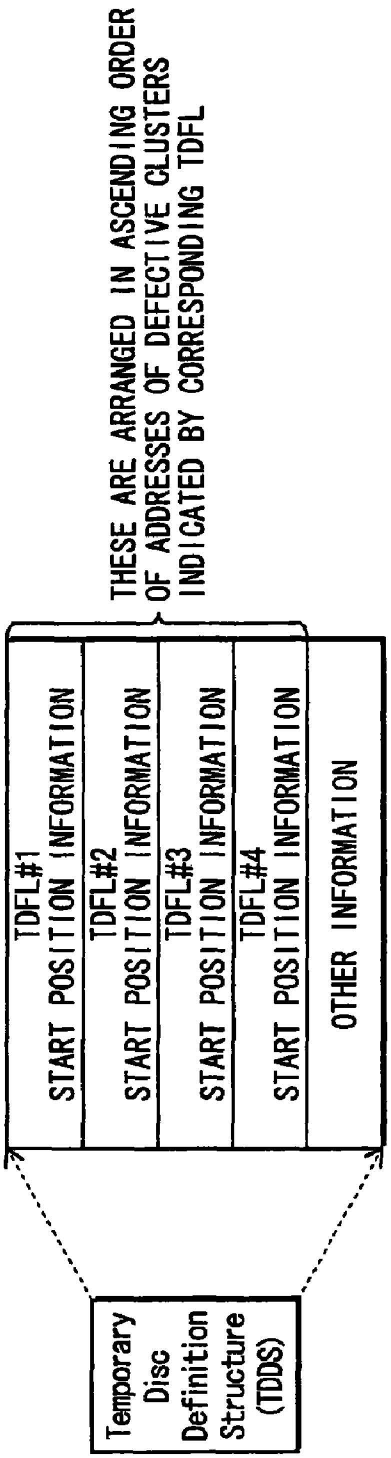
FIG. 7B shows the data structure of the TDDS.

FIG. 7B shows the data structure of the TDDS. The TDDS is information having a fixed size, and is composed of one sector that is 2 KB in size. The TDDS has the same size as the DDS. The TDDS is assigned to a sector at a predetermined position among the 32 sectors constituting the last cluster of the TDMS. For example, the TDDS is assigned to the last sector among the 32 sectors constituting the last cluster of the TDMS. As shown in FIG. 7B, the TDDS includes a plurality of pieces of TDFL position information (TDFL pointers) which show starting positions of TDFLs, and also includes "other information". The TDDS, as is the case with the DDS, indicates positions of DFLs, but differs critically from the DDS in that when the TDMS includes a plurality of TDFLs, the TDDS includes a plurality of pieces of TDFL position information that respectively show the starting positions of the TDFLs. The plurality of pieces of TDFL position information are arranged in the ascending order of the addresses of the defective areas that are indicated by the TDFLs which correspond one-to-one to the plurality of pieces of TDFL position information. And therefore, the TDFL#1 position information is adjacent to the TDFL#2 position information in the TDDS. When there are four TDFLs, TDFL#1 to TDFL#4, in one TDMS, the positions of the four TDFLs are indicated by the TDDS. Since the TDDS indicates positions of the TDFLs, it is possible to arrange the TDFLs discretely in one TDMS.

The demand for arranging the TDFLs discretely is especially strong for the case where a set of clusters constituting one TDMS includes a defective cluster.

<Discrete Arrangement of TDFLs>

Figure 8:
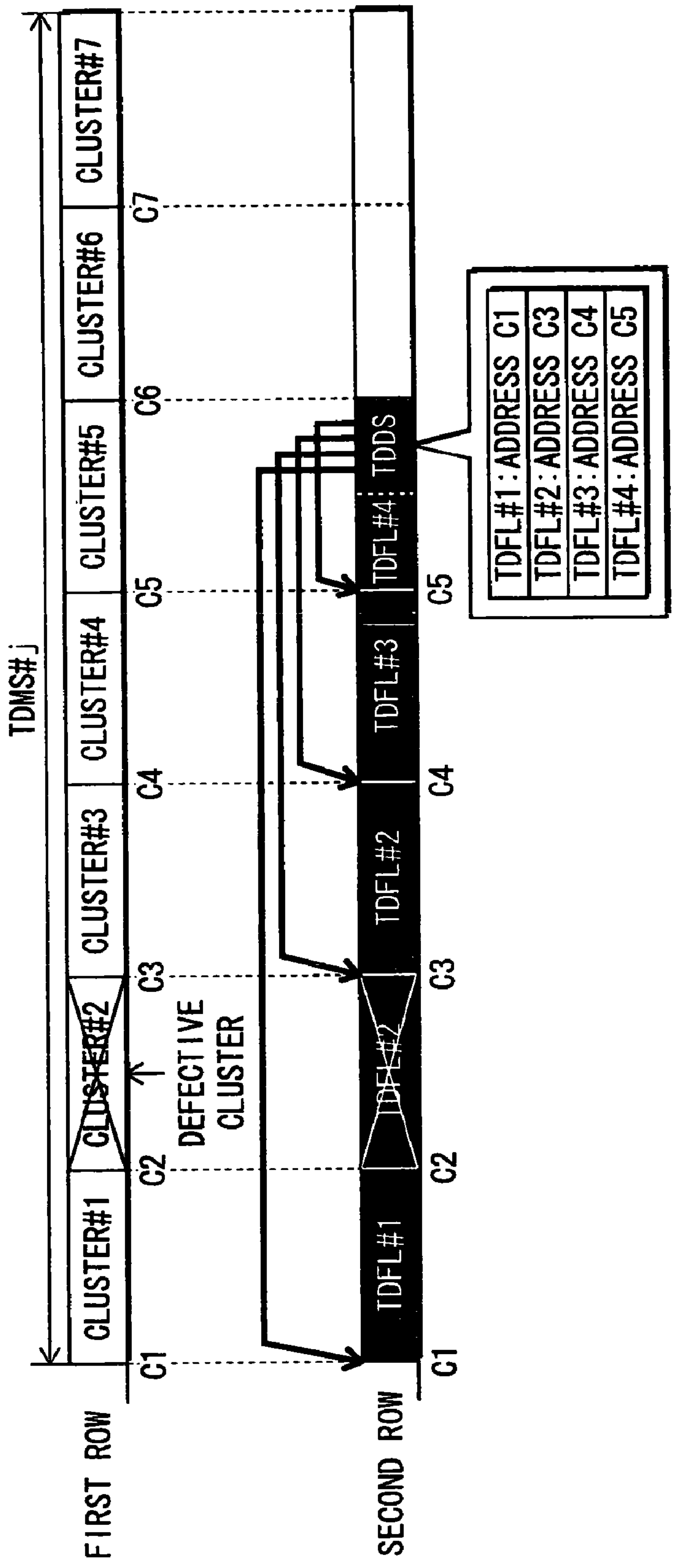
FIG. 8 shows one example of a discrete arrangement of TDFLs.

FIG. 8 shows one example of a discrete arrangement of TDFLs. The first row of FIG. 8 shows a plurality of clusters (cluster#1, cluster#2, cluster#3, . . . cluster#7) that constitute a TDMS. The second row shows four TDFLs (TDFL#1, TDFL#2, TDFL#3 and TDFL#4) and a TDDS, which are written in these clusters.

The TDMS#j shown in FIG. 8 is composed of cluster#1 to cluster#7, among which cluster#2 is a defective cluster. In FIG. 8, TDFL#1 to TDFL#4 are written in cluster#1 which precedes the defective cluster#2, and in cluster#3 to cluster#5 which succeed the defective cluster#2, which means TDFL#1 to TDFL#4 are written into discontinuous clusters.

The TDDS shown in FIG. 8 includes TDFL#1 position information (TDFL#1: address C1) and TDFL#2 position information (TDFL#2: address C3), where the TDFL#1 position information indicates the address C1, which is the address of the last cluster (cluster#1) among clusters that precede the defective cluster, as the start position of TDFL#1, and the TDFL#2 position information indicates the address C3, which is the address of the first cluster (cluster#3) among clusters (cluster#3 to cluster#5) that succeed the defective cluster, as the start position of TDFL#2. The TDDS shown in FIG. 8 is characterized in that a plurality of pieces of TDFL position information (TDFL#1 position information, TDFL#2 position information, TDFL#3 position information, and TDFL#4 position information) are arranged in the ascending order of the addresses of the defective areas indicated by the corresponding TDFLs, and that the TDFL#1 position information is adjacent to the TDFL#2 position information in the TDDS. With such a construction, if the TDFLs are read in accordance with the position information in the TDDS, TDFL#1 to TDFL#4 are read in a predetermined order regardless of whether there is a defective cluster, and they can be arranged in the memory.

As described above, the TDDS in the present embodiment includes four pieces of TDFL position information which respectively indicate the start positions of the clusters in which corresponding four TDFLs are written. This enables TDFL#1 and TDFL#2 to TDFL#4 to be arranged discretely. For this reason, TDFL#2 to TDFL#4, which would be recorded, starting with TDFL#1, in a series of clusters succeeding the defective cluster#2 in the TDMS according to conventional technologies, are recorded in cluster#3 to cluster#5 immediately after the defective cluster#2 in the TDMS.

With such a construction in which the TDDS indicates the positions (addresses C1, C3, C4, and C5) of the clusters in which TDFL#1 to TDFL#4 are respectively recorded, even if TDFL#1 to TDFL#4 are arranged discretely, it is possible, during reproduction, to read out the TDFLs sequentially in a predetermined order onto the memory in the apparatus for reproduction, only by accessing the clusters in the TDMS in accordance with the positions indicated by the TDDS.

It would be needless to say that although in the present embodiment, the second cluster in the TDMS is a defective cluster, it is an example case provided for the sake of convenience, and there is no need for the second cluster to be defective, and there may be any number of defective clusters.

As apparent from the above description, in the optical disc 1 in the first embodiment, a plurality of pieces of TDFL-position information are stored in the TDDS in the ascending order of defect entries, and the TDFLs can be recorded in discrete areas excluding the defective areas, enabling the TDMA, which has a finite size, to be used efficiently.

<Comparison Between DFL Position Information and TDFL Position Information>

DFLs are recorded in a plurality of discrete areas ($1^{st}$ DMA to $4^{th}$ DMA) on the optical disc 1. A plurality of pieces of DFL position information are respectively stored in areas at predetermined positions on the optical disc 1 (a piece of DFL position information is stored in the DDS which is at the start of each of $1^{st}$ DMA to $4^{th}$ DMA), in the ascending order of the addresses of the defective areas indicated by the defect entries.

TDFLs are recorded in a plurality of discrete areas (areas before and after the defective cluster shown in FIG. 8) on the optical disc 1. A plurality of pieces of TDFL position information are stored in an area at a predetermined position on the optical disc 1 (a plurality of pieces of TDFL position information are stored in the TDDS which is positioned immediately before not-recorded areas in the TDMS), in the ascending order of the addresses of the defective areas indicated by the defect entries.

It can be said that the DFL recording method and the TDFL recording method have in common that position information, which indicates a position of a defect entry, is recorded in a predetermined area. As a result, the reproduction apparatus can use both DFLs and TDFLs following a common procedure regardless of whether the defective entries are included in DFLs or TDFLs, namely, by reading a plurality of pieces of position information from a predetermined area on the optical disc 1 (DDSs positioned at the start of each of 1$^{st}$ DMA to 4$^{th}$ DMA, or TDDS positioned immediately before not-recorded areas in the TDMS), and reading the defective entries according to the plurality of pieces of position information in an order thereof.

As explained above, the present embodiment achieves a control procedure using TDFLs that is compatible with a control procedure using DFLs. This enables such a control procedure using TDFLs to be implemented in the reproduction apparatus, without forcing the reproduction apparatus to use complex software for the control. As such, the TDFL position information of the present embodiment produces excellent advantageous effects that it achieves compatibility with the procedure using DFLs and simplifies the control software in the reproduction apparatus.

This completes the description of an embodiment of the optical disc of the present invention.

<Recording/Reading Apparatus 100>

Figure 9:
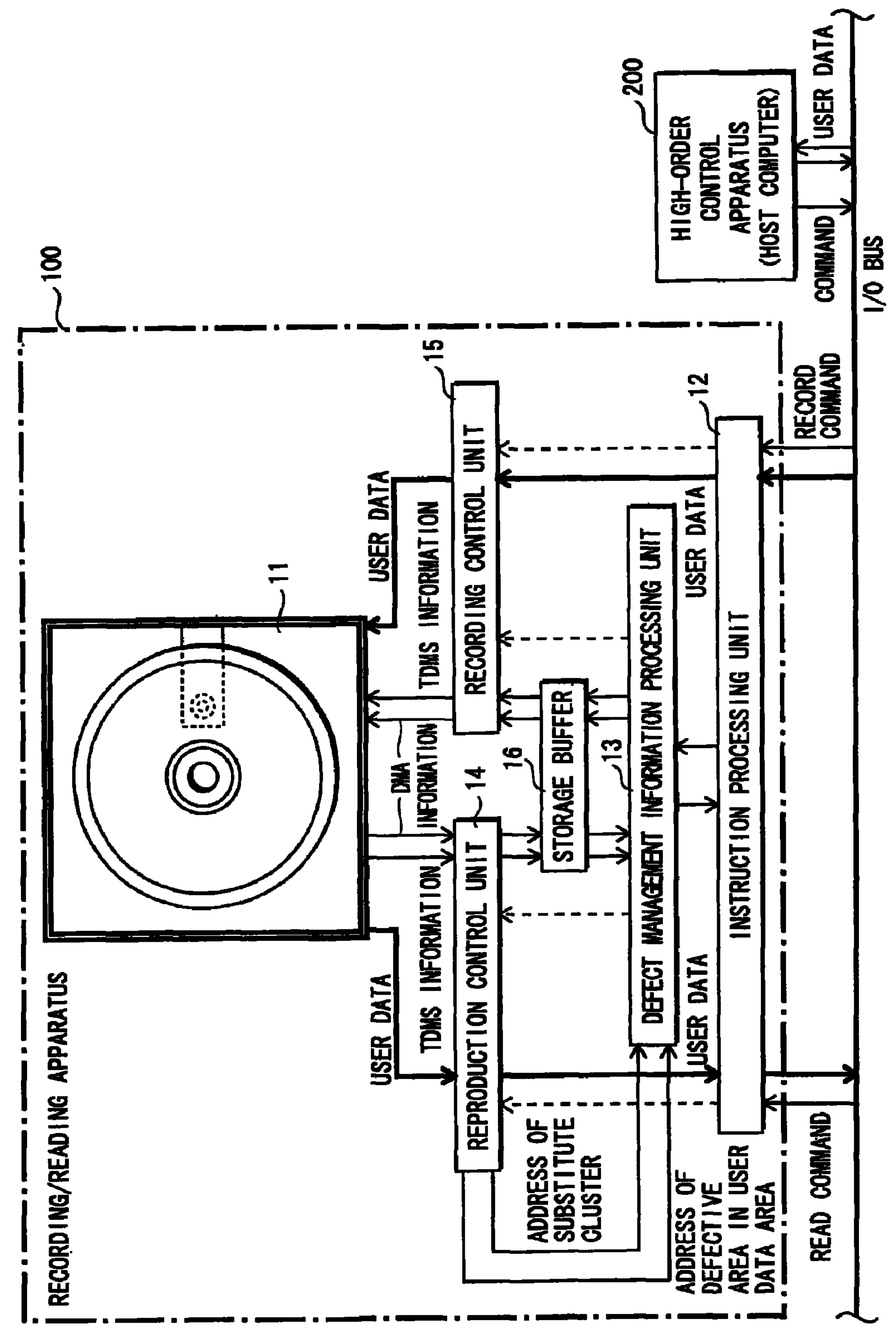
FIG. 9 shows the internal structure of the recording/reading apparatus 100.

From now on, an embodiment of the recording/reading apparatus of the present invention will be described. A recording/reading apparatus 100 shown in FIG. 9 is an apparatus that is provided with the functions of both the recording and reading apparatuses of the present invention. The following explanation will be provided in regards with the recording/reading apparatus 100.

In FIG. 9, the recording/reading apparatus 100 is connected to a high-order control apparatus 200 via an I/O bus. Typically, the high-order control apparatus 200 is a host computer. In accordance with the commands issued by the high-order control apparatus 200, reading data from or writing data to the optical disc 1 are executed. In this writing, no data is recorded in the DMA until the finalize process is performed, and information concerning one or more defective clusters detected during recording is written in the TDMS.

In FIG. 9, the recording/reading apparatus 100 includes a drive mechanism 11, an instruction processing unit 12, a defect management information processing unit 13, a reproduction control unit 14, a recording control unit 15, and a storage buffer 16.

The drive mechanism 11 performs loading/ejecting of the optical disc 1, optically reads the contents of the optical disc 1 from it, and optically writes data onto the optical disc 1.

The instruction processing unit 12 reads or writes user data from/to the optical disc 1 in accordance with a command issued from the high-order control apparatus 200.

The defect management information processing unit 13 accesses the optical disc 1 using the defect entries, and updates the TDMS.

It should be noted here that "accessing the optical disc 1 using the defect entries" means that if a read or write destination specified by the command from the high-order control apparatus 200 is a defective cluster indicated in a defect entry, a substitute cluster is accessed in place of the defective cluster. Also, if a defective area is newly detected during an access to the user data area of the optical disc 1 by the instruction processing unit 12, a defect entry concerning the newly detected defective area is newly generated.

It should also be noted that "updating the TDMS" means that in recording of data, the defect entry concerning the newly detected defective area is added to the TDFL in the latest TDMS, and writes the TDFL, to which the defect entry concerning the newly detected defective area was added, into the next TDMS.

In accordance with an instruction from the instruction processing unit 12 or the defect management information processing unit 13, the reproduction control unit 14 controls the drive mechanism 11 to read data from a desired cluster on the optical disc 1.

In accordance with an instruction from the instruction processing unit 12 or the defect management information processing unit 13, the recording control unit 15 controls the drive mechanism 11 to write data into a desired cluster on the optical disc 1.

The storage buffer 16 is a buffer used to temporarily store information read from DMA (DMA information) and information read from TDMS (TDMS information).

Up to now, the internal structure of the recording/reading apparatus 100 has been described.

<Internal Structure of Defect Management Information Processing Unit 13>

Figure 10:
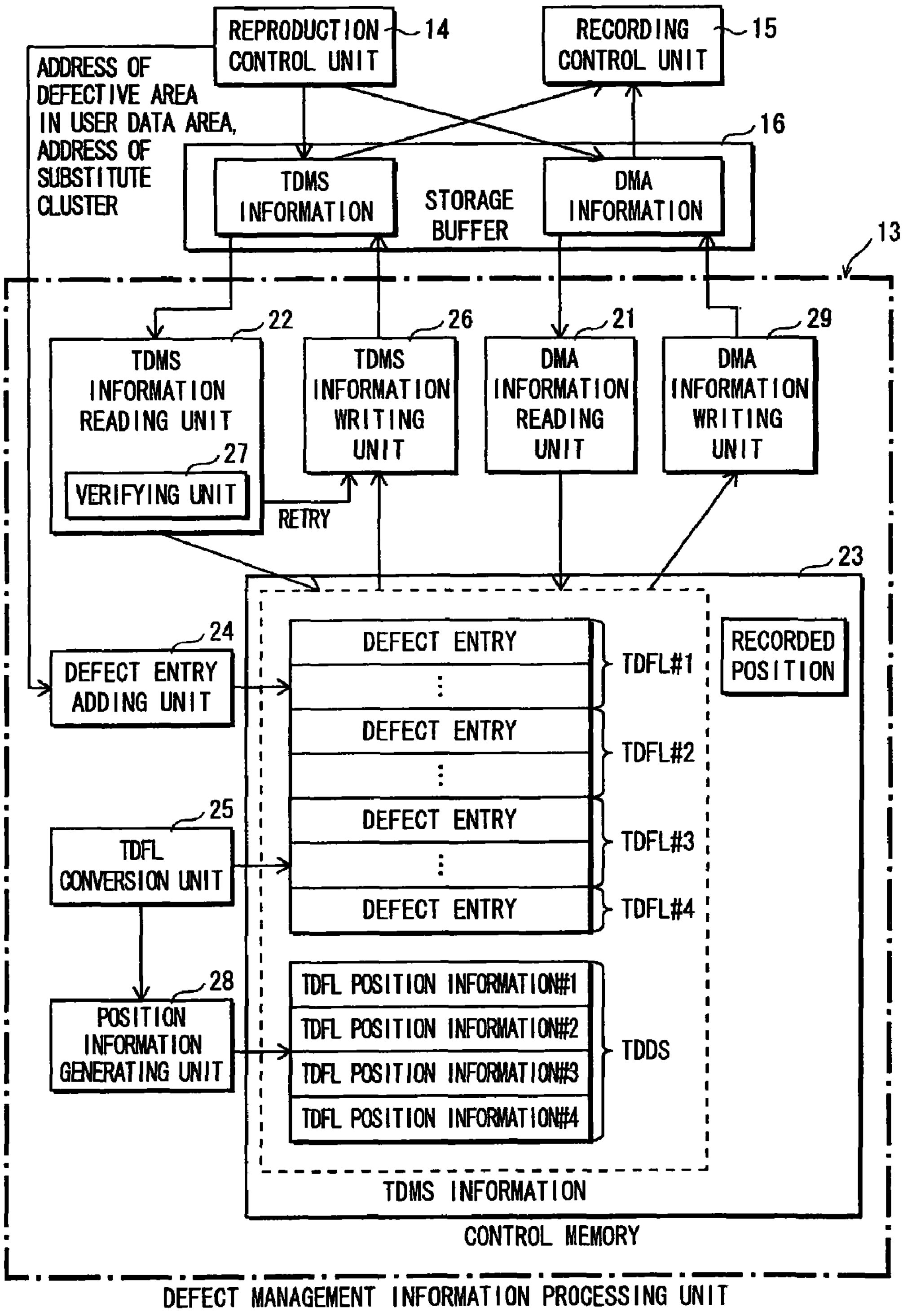
FIG. 10 shows the internal structure of the defect management information processing unit 13.

Here, the internal structure of the defect management information processing unit 13 will be described in detail. FIG. 10 shows the internal structure of the defect management information processing unit 13. In FIG. 10, the defect management information processing unit 13 includes a DMA information reading unit 21, a TDMS information reading unit 22, a control memory 23, a defect entry adding unit 24, a TDFL conversion unit 25, a TDMS information writing unit 26, a verifying unit 27, a position information generating unit 28, and a DMA information writing unit 29.

<DMA Information Reading Unit 21>

The DMA information reading unit 21 determines normal DMAs among the 1$^{st}$ DMA to the 4$^{th}$ DMA, and reads the contents of the normal DMAs onto the control memory 23. It should be noted here that the DMA information reading unit 21 judges that it is "after the finalize process" if the 1$^{st}$ DMA to the 4$^{th}$ DMA can be reproduced normally, and judges that it is "before the finalize process" if data cannot normally be read from the 1$^{st}$ DMA to the 4$^{th}$ DMA since no data has been recorded therein.

<TDMS Information Reading Unit 22>

The TDMS information reading unit 22, if the optical disc 1 loaded in the recording/reading apparatus 100 is "not-finalized", searches for a last cluster in which data is recorded, and searches for the latest TDMS (TDMS#j−1). The TDMS information reading unit 22 then extracts the TDDS from the last cluster in which data is recorded, and acquires the number of TDFLs, which is represented as "n", and positions of the TDFLs. Using the acquired positions, the TDMS information reading unit 22 reads TDFLs from the latest TDMS onto the control memory 23, and holds them as a plurality of defect entries that constitute a DFL. The plurality of defect entries are used in the read-process.

<Control Memory 23>

The control memory 23 is a memory for storing data for work, such as defect entries.

<Defect Entry Adding Unit 24>

The defect entry adding unit 24, if a defective area is detected in the j$^{th}$ record process, adds a defect entry concerning the detected defective area to a plurality of defect entries having been read onto the control memory 23. More specifically, if, for example, a defective cluster is newly detected in the user data area 6, the defect entry adding unit 24 adds a defect entry corresponding to the newly detected defective cluster to a plurality of defect entries stored in the control memory 23. Further, according to the defective cluster position information included in the defect entry, the defect entry adding unit 24 sorts defect entries, and increases the number of defect entries by "1".

<TDFL Conversion Unit 25>

The TDFL conversion unit 25 arranges (i) defect entries concerning defective areas detected in the latest record process, and (ii) defect entries concerning defective areas detected in the other previous record processes, in the ascending order of the addresses of the defective areas indicated by these defect entries, and converts the arranged defect entries into "TDFLs". This achieves an update of TDMSs. During this conversion, the TDFL conversion unit 25 calculates the total size of the plurality of defect entries stored in the control memory 23, and judges whether or not a result of adding the total size to the fixed size of the TDDS exceeds the size of one cluster. If the addition result is smaller than the cluster size, the TDFL conversion unit 25 converts the plurality of defect entries into one TDFL. When a TDMS is composed of one cluster, the size of the cluster should be a result of adding up the size of TDFL#1 and the fixed size of the TDDS. Here, since the size of the TDDS is identical with the size of one sector, the TDFL is identical with 31 sectors in size at the largest. If the addition result is no smaller than the cluster size, the TDFL conversion unit 25 converts the plurality of defect entries into a plurality of TDFLs.

<TDMS Information Writing Unit 26>

Figures 11A, 11B, 11C, 11D:
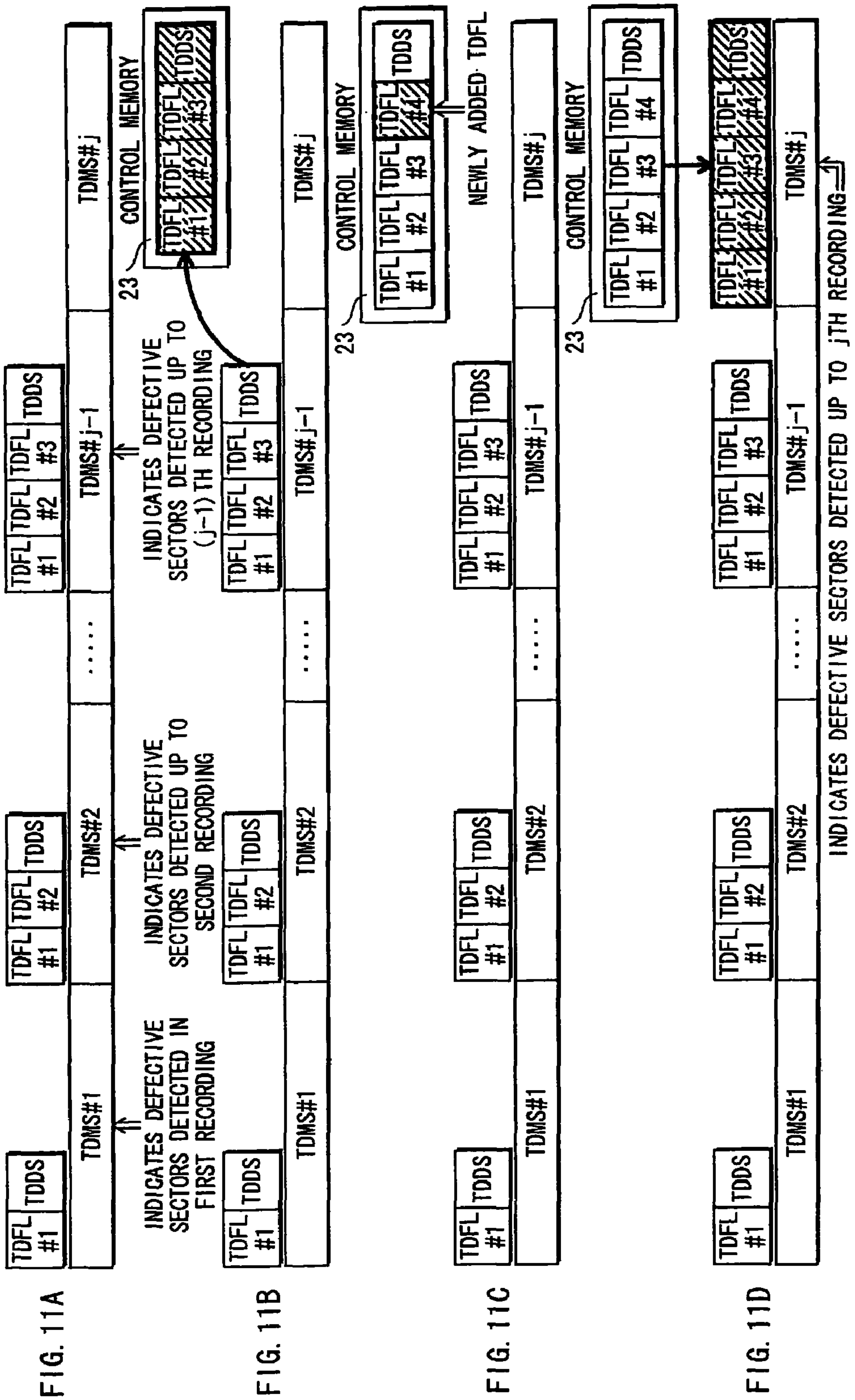
FIGS. 11A to 11D show reading of TDMS information by the TDMS information reading unit 22 and writing of TDMS information by the TDMS information writing unit 26.

The TDMS information writing unit 26 writes the TDFLs obtained as a result of the conversion by the TDFL conversion unit 25, into the latest TDMS (TDMS#j) in the ascending order of the addresses of the defective areas indicated by the TDFLs. After writing the TDFLs, the TDMS information writing unit 26 also writes the TDDS into TDMS#j. FIGS. 11A to 11D show reading of TDMS information by the TDMS information reading unit 22 and writing of TDMS information by the TDMS information writing unit 26. FIG. 11A shows the state before the reading/writing of TDMS information is performed. In FIG. 11A, TDFLs and TDDS have been written in TDMS#1 to TDMS#j−1 among the N number of TDMSs, and only TDMS#j−1 is valid. In this case, the TDMS information reading unit 22, in the $j^{th}$ recording, reads TDFL #1 to TDFL#3 and the TDDS from TDMS#j−1 (FIG. 11B). It is supposed here that a defective area is detected in the $j^{th}$ recording. TDFL#4 concerning this defective area is combined with TDFL#1 to TDFL#3 written in TDMS#j−1 (FIG. 1C). The TDMS information writing unit 26 writes TDFL#1 to TDFL#4 and the TDDS into TDMS#j (FIG. 11D). TDMS#j at this stage includes the TDFLs that show all the defective areas that were detected in the first to $j^{th}$ recordings.

<Verifying Unit 27>

The verifying unit 27 is a component embedded in the TDMS information reading unit 22, and verifies the TDFLs written by the TDMS information writing unit 26. In the present document, the term "verify" indicates an operation to confirm whether or not recording data into a cluster has been completed normally. The verifying is achieved by performing an error correction onto the recorded data, or by reading the recorded data and judging whether or not the read data matches the preliminarily recorded data. If it is judged that the data is not recorded normally due to a defect or the like, the TDMS information writing unit 26 retries writing of TDFLs.

<Position Information Generating Unit 28>

The position information generating unit 28, when the TDMS information writing unit 26 tries to write TDFLs into TDMS#j, creates, in the TDDS of the control memory 23, the TDFL position information that indicates write destinations of the TDFLs. The position information generating unit 28 creates the TDFL position information when writing of TDFLs is retried, as well as in the initial writing of the TDFLs. After a plurality of pieces of TDFL position information are generated in the TDDS on the control memory 23, only pieces of TDFL position information concerning the normally recorded TDFLs are extracted from the plurality of pieces of TDFL position information, and the extracted pieces of TDFL position information are arranged in the ascending order of the addresses of the defective areas indicated by the corresponding TDFLs. With this construction, even if normal TDFLs are discretely arranged in TDMS#j due to a retried writing of TDFLs, only pieces of TDFL position information concerning the normally recorded TDFLs are extracted, and they are arranged in the ascending order of the addresses of the defective areas indicated by the corresponding TDFLs.

As described above, even if normal TDFLs are arranged in TDMS#j discretely, the position information generating unit 28 rearranges the plurality of pieces of TDFL position information so that pieces of TDFL position information corresponding to the normal TDFLs arranged in TDMS#j discretely can be read out in a predetermined order. When the TDMS information writing unit 26 writes the last TDFL, the TDDS is written into the TDMS together with the last TDFL.

<DMA Information Writing Unit 29>

Figures 12A, 12B, 12C:
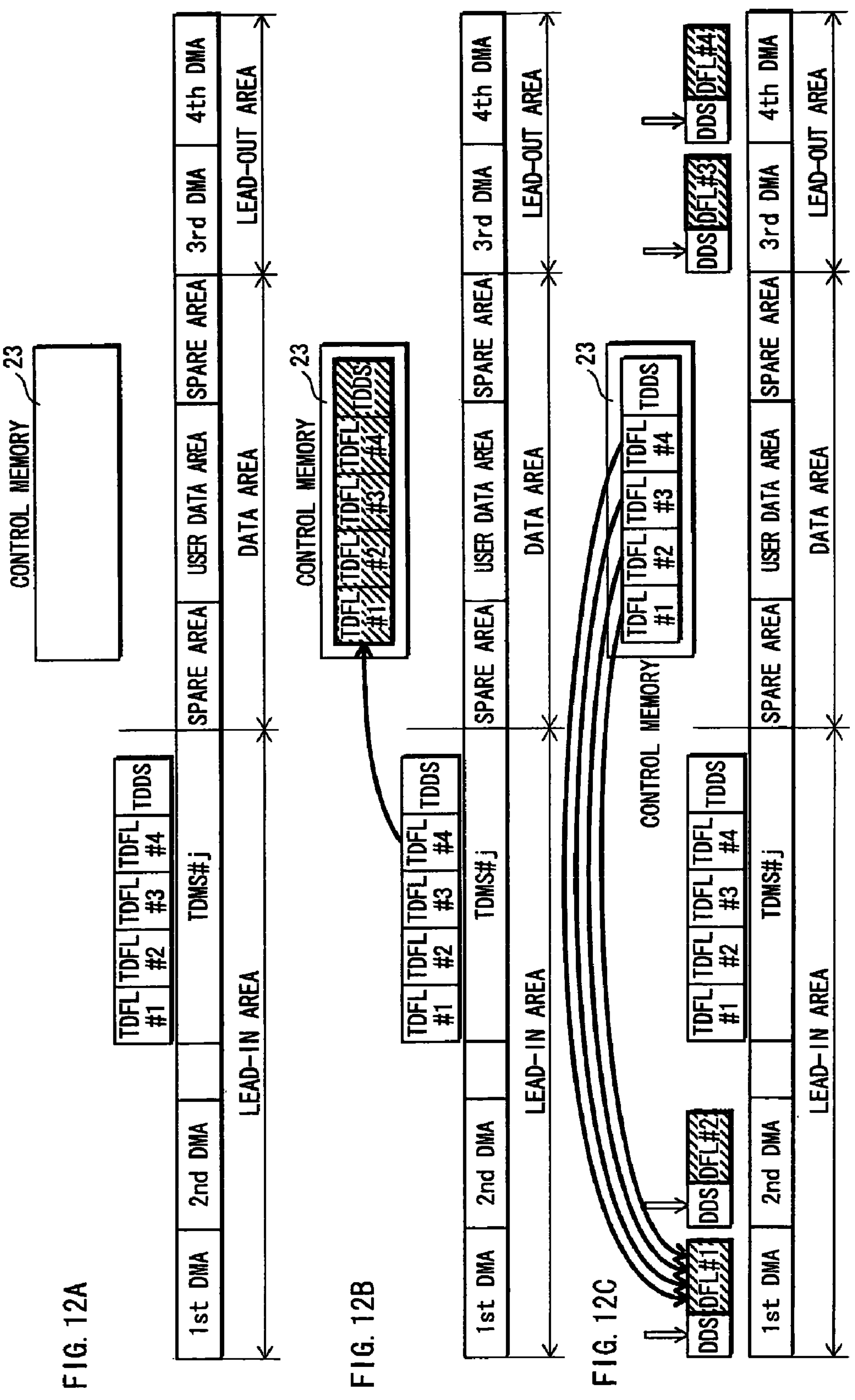
FIGS. 12A to 12C show writing of DMA information by the DMA information writing unit 29.

The DMA information writing unit 29 records data into the $1^{st}$ DMA to the $4^{th}$ DMA during the finalize process. FIGS. 12A to 12C show writing of information by the DMA information writing unit 29. FIG. 12A shows the state before the writing is performed. In FIG. 12A, TDMS#1 to TDMS#4 and TDDS have been written in TDMS#j among the N number of TDMSs, and only the latest TDMS#j is valid. In this case, the contents of TDMS#j are read by the DMA information reading unit 21 onto the control memory 23-(FIG. 12B), defect entries written in TDFL#1 to TDFL#4 in TDMS#j are converted into DFLs by the DMA information writing unit 29, and the data after the conversion is written into the $1^{st}$ DMA (FIG. 12C). Similarly, the DFLs converted from TDFL#1 to TDFL#4 are written into the $2^{nd}$ DMA, $3^{rd}$ DMA, and $4^{th}$ DMA.

Up to now, the internal structure of the defect management information processing unit 13 has been described. From now on, implementing the defect management information processing unit 13 from software will be described. The defect management information processing unit 13 can be implemented in the recording/reading apparatus 100 by generating a program based on the flowcharts shown in FIGS. 13 to 15, and causing the CPU to run the program.

Figure 13:
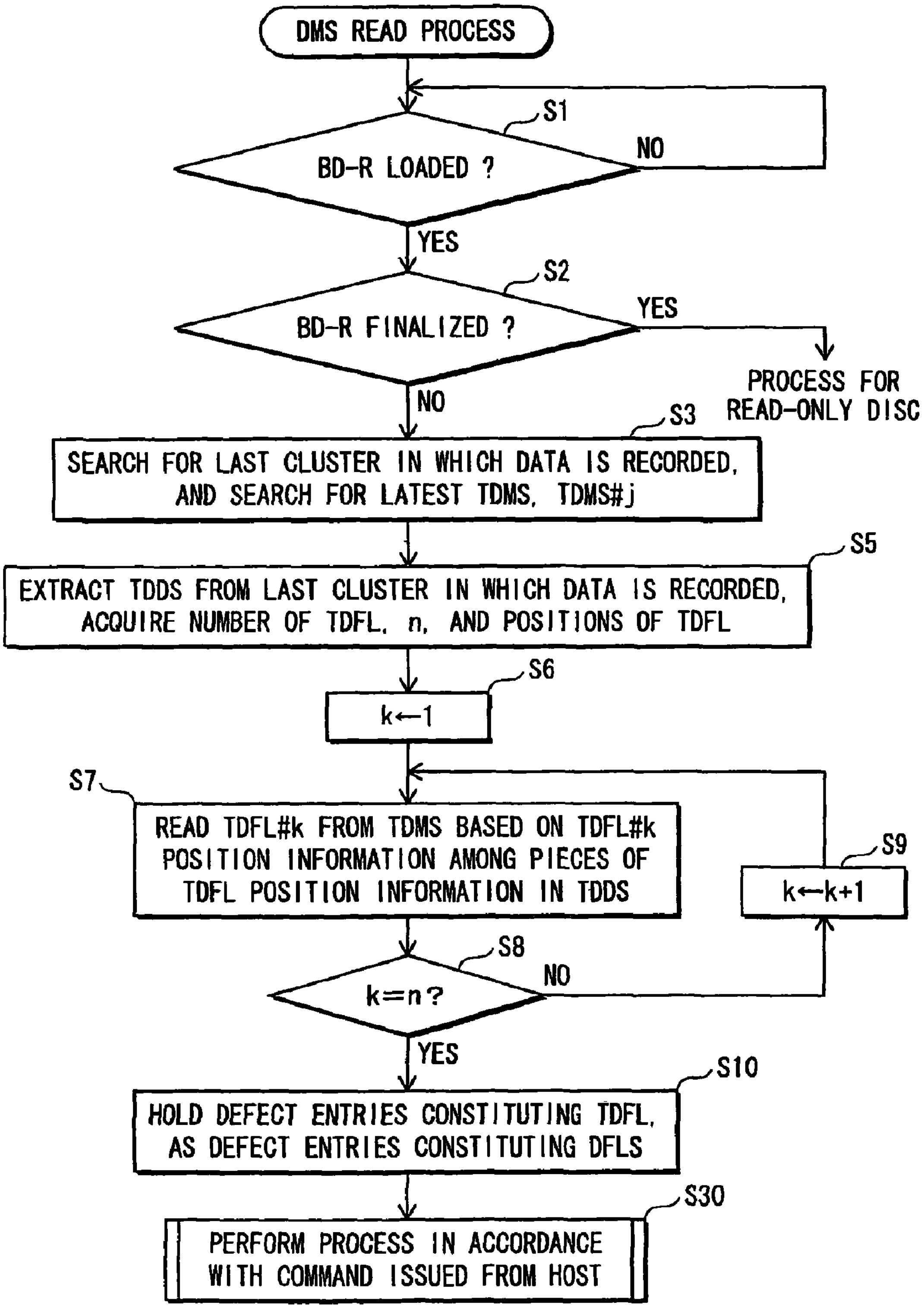
FIG. 13 is a flowchart showing the procedure of the DFL read process.

FIG. 13 is a flowchart showing the procedure of the DFL read process.

In step S1, it is checked whether or not the optical disc 1 has been loaded. If it is confirmed that the optical disc 1 has been loaded, in step S2, the DMA information reading unit 21 judges whether or not the optical disc 1 has been finalized. If the optical disc 1 has been finalized, the optical disc 1 is subjected into a process that is the same as a process for a read-only disc.

If the optical disc 1 has not been finalized, the TDMS information reading unit 22 searches a plurality of TDMSs for the last cluster among those in which data is recorded, and searches for the latest TDMS, TDMS#j (step S3). The TDMS information reading unit 22 then extracts the TDDS from the last cluster among those in which data is recorded, and acquires the number of TDFLs, which is represented as "n", and positions of the TDFLs (step S5). After acquiring the positions, the TDMS information reading unit 22 executes the loop composed of steps S6 to S9. In this loop, it initializes the variable k (step S6), reads TDFL#k from TDMS based on the TDFL#k position information among a plurality of pieces of TDFL position information in the TDDS (step S7). In the present flowchart, the variable k is used as a control variable. The variable k is incremented by one each time a loop composed of steps S7 to S9 is performed (step S9). The control goes out of the loop when the variable k becomes n (step S8).

After the TDFLs are read as described above, defect entries constituting the TDFLs are held by the control memory 23 as defect entries constituting the DFLs (step S10). Then, the read or write process for reading or writing data from/to the optical disc 1 is performed in accordance with a command issued from the high-order control apparatus 200 (step S30).

Figure 14:
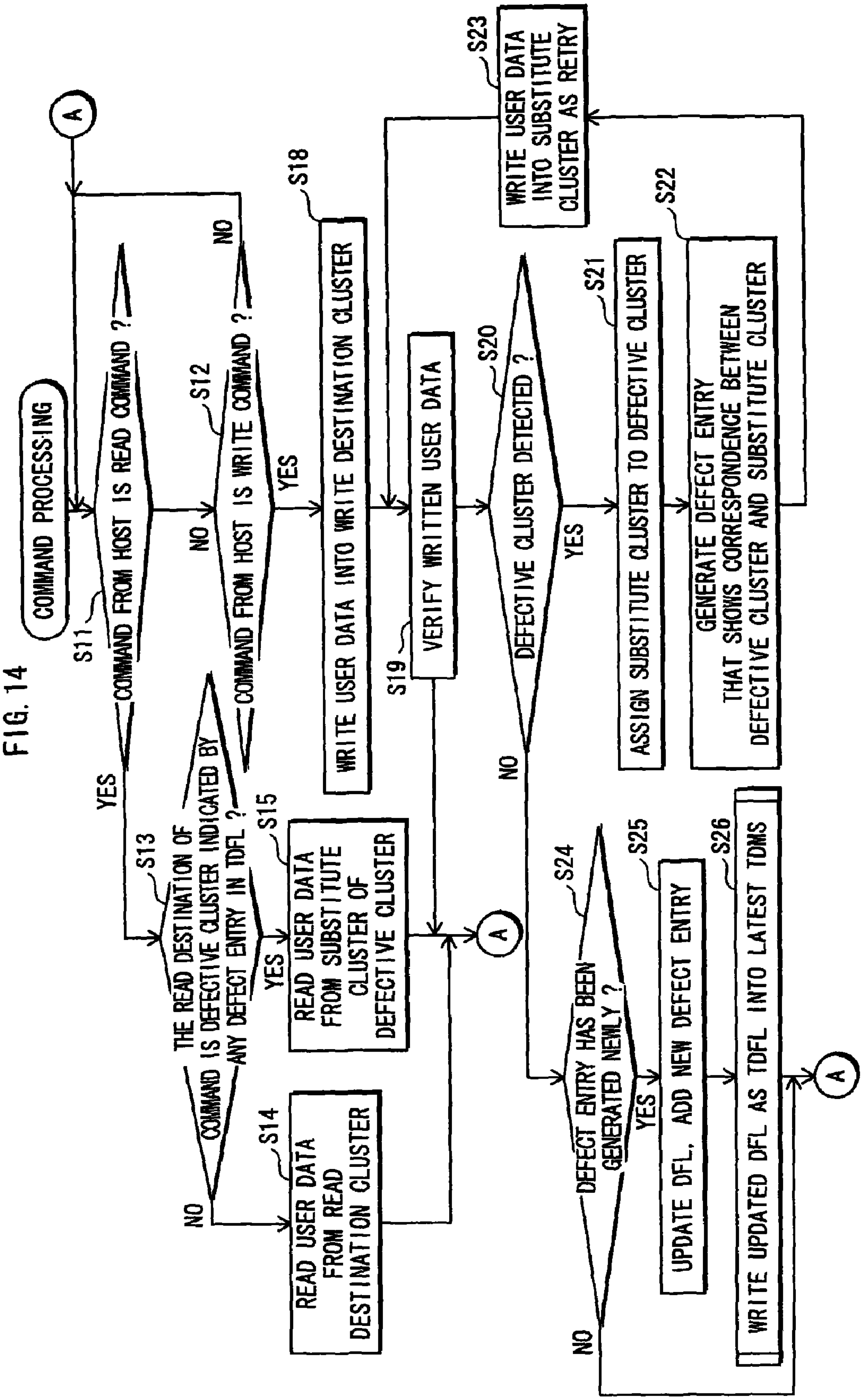
FIG. 14 is a flowchart showing the procedure of the read/write process to be performed in accordance with a command issued from the high-order control apparatus 200.

FIG. 14 is a flowchart showing the procedure of the read/write process to be performed in accordance with a command issued from the high-order control apparatus 200.

In FIG. 14, the steps S11 and S12 constitute a command wait loop. In step S11, the instruction processing unit 12 judges whether or not the command issued from the high-order control apparatus 200 is the read command. In step S12, the instruction processing unit 12 judges whether or not the command issued from the high-order control apparatus 200 is the write command.

If the command issued from the high-order control apparatus 200 is the read command, the steps S13 to S15 are performed. In step S13, the instruction processing unit 12 judges whether or not the read destination of the command is a defective cluster indicated by any defect entry in the DFL. If the read destination is not a defective cluster, user data is read from the read destination (step S14). If the read destination is a defective cluster, the defect management information processing unit 13 reads user data from a substitute cluster for the defective cluster (step S15), and returns to the loop composed of the steps S11 to S12.

If the command issued from the high-order control apparatus 200 is the write command, user data is written into the write destination cluster (step S18). After this, the control moves to a loop composed of the steps S19 to S23.

In this loop, the following steps (steps S19-S23) are repeatedly performed until it is judged as "No" in step S20. First, the written user data is verified (step S19). If the verification result indicates a detection of a defective cluster (Yes in step S20), the defect management information processing unit 13 assigns a substitute cluster to the defective cluster (step S21), and generates a defect entry that shows correspondence between the defective cluster and the substitute cluster (step S22) the user data is written into the substitute cluster as a retry (step S23).

If the verification of the written user data does not detect any defective cluster, a process composed of the steps S24 to S26 is performed as follows. First, it is judged whether or not a defect entry has been generated newly (step S24). If a defect entry has been generated newly, the DFL is updated and the new defect entry is added (step S25). The DFL after the update is written into the latest TDMS (step S26). The control then returns to the loop composed of the steps S11 to S12.

Figure 15:
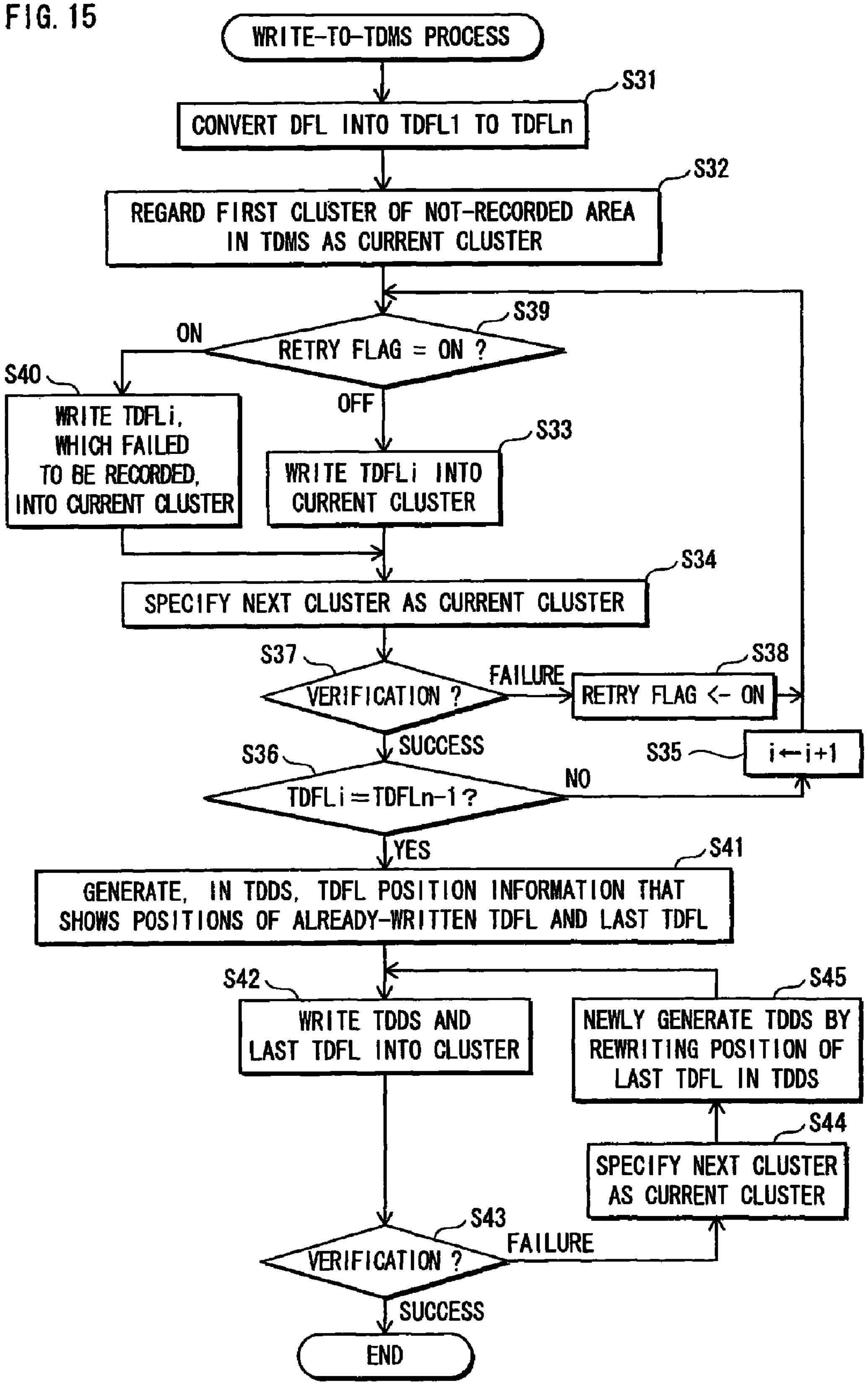
FIG. 15 is a flowchart showing the procedure of the write-to-TDMS process.

FIG. 15 is a flowchart showing the procedure of the write-to-TDMS process.

In step S31, the TDFL conversion unit 25 converts a plurality of defect entries included in the DFLs into one or more TDFLs. In step S32, the start position of a cluster, which has a larger serial number than the last data-recorded cluster in the TDMA of the control memory 23, is obtained, where the cluster of the obtained start position is the first cluster of the not-recorded area. The first cluster of the not-recorded area is regarded as the current cluster. The recording starts with the current cluster.

After this, a loop composed steps S33 to S40 is performed. In this loop, not-recorded TDFLs are fetched one by one in the ascending order from the control memory 23, and the TDMS information writing unit 26 writes the fetched TDFL into the current cluster as TDFLi (step S33). Then, the next cluster is specified as the current cluster (step S34), and the variable I is incremented (step S35). The loop is repeated until TDFLi becomes TDFLn−1, which is the TDFL immediately before the last TDFL (Yes in step S36).

In this loop, each time one TDFL is written, the verifying unit 27 verifies the writing (step S37). If the verification reveals that a cluster in which the TDFL is written is defective, the variable i is not incremented, but the retry flag is turned ON (step S38). In step S39 positioned before the step S33, it is judged whether the retry flag is ON or OFF. If it is judged that the retry flag is ON, the TDMS information writing unit 26 writes the TDFLi that failed to be recorded, into the current cluster (step S40).

When TDFL#1 to TDFL#3 (the TDFL before the last TDFL) have been written in the TDMS after the above-stated steps are repeated, steps S41 to S45 are performed.

The steps S41 to S45 constitute a process in which the last TDFL and the TDDS are written into the TDMS. In step S41, the position information generating unit 28 generates, in the TDDS, TDFL position information that indicates the positions of the already-written TDFLs and the position to write the last TDFL (step S41). Then a loop composed of steps S42 to S45 is performed.

The loop is performed as follows. That is to say, the TDMS information writing unit 26 writes the generated TDDS and the last TDFL into the current cluster (step S42), and the verifying unit 27 verifies the cluster in which the data was written (step S43). If the cluster is not defective, the process ends. If the cluster is defective, the next cluster is specified as the current cluster (step S44). The position information generating unit 28 then newly generates a TDDS by rewriting the position of the last TDFL in the TDDS (step S45). The steps S42 and S43 are then performed again.

The rewriting of the TDFL position information by the position information generating unit 28 in step S45 is achieved by writing the address of the current cluster into the TDFL position information of the last TDFL.

Figure 16:
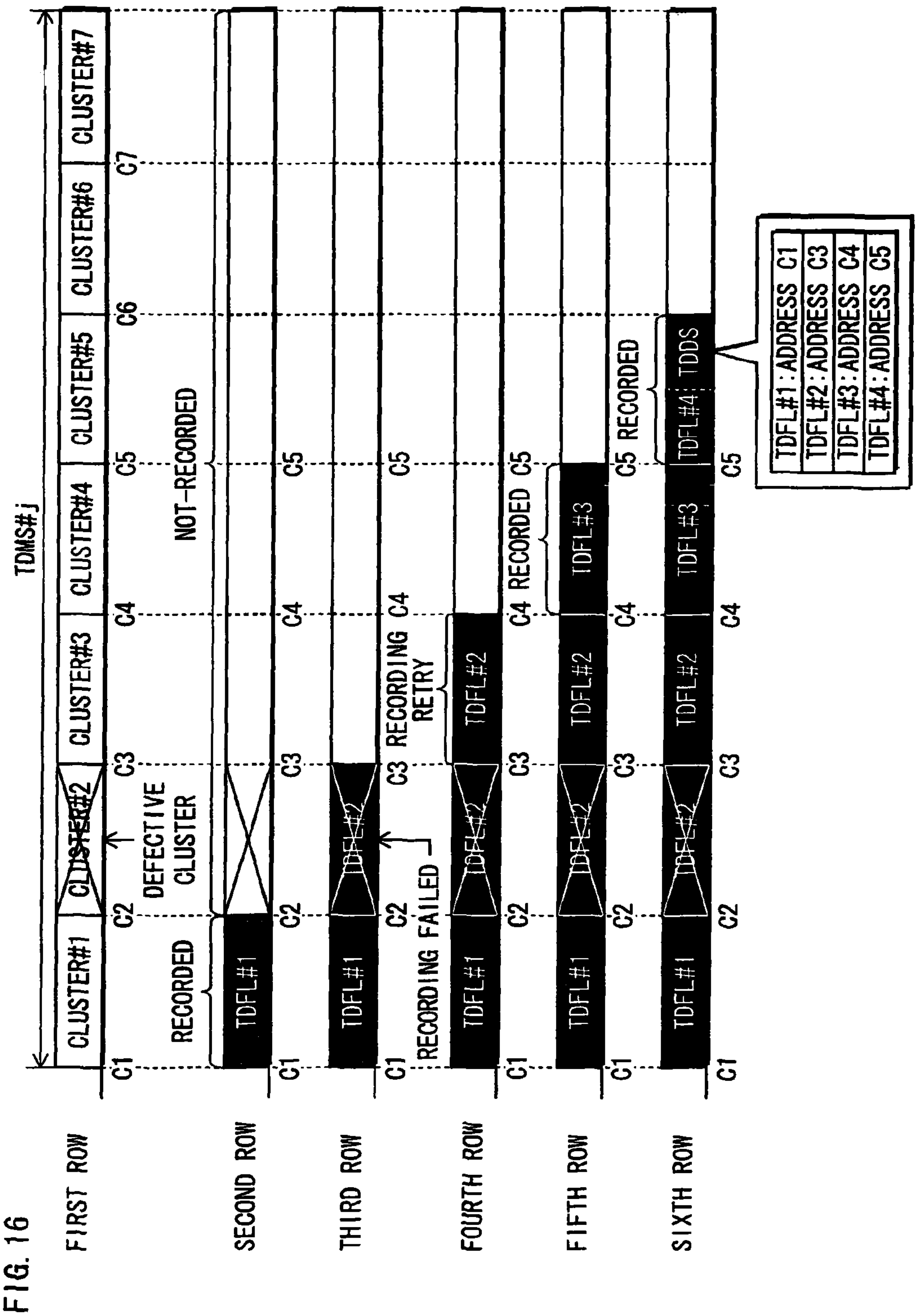
FIG. 16 shows how the recording/reading apparatus 100 of the first embodiment writes the TDFLs.

FIG. 16 shows how the recording/reading apparatus 100 of the first embodiment writes the TDFLs. The first row of FIG. 16 shows a plurality of clusters that constitute a TDMS. The second to sixth rows show four TDFLs (TDFL#1, TDFL#2, TDFL#3, and TDFL #4) and a TDDS written in these clusters. It is presumed that cluster#2 shown in the first row is a defective cluster.

The second row indicates the state in which TDFL#1 has been written in cluster#1 among the clusters constituting the TDMS. The third row indicates that writing TDFL#2 into cluster#2 was tried, but failed since cluster#2 is a defective cluster. This causes a retry to be made to record TDFL#2. The fourth row indicates that TDFL#2 is written in cluster#3 that is adjacent to the defective cluster#2, in a recording retry. The fifth row indicates that TDFL#3 has been written in cluster#4. The sixth row indicates that the last TDFL (TDFL#4) and the TDDS have been written in cluster#5.

Although TDFL#1 and TDFL#2 to TDFL#4 are arranged discretely with a defect entry in between, the TDDS written together with the last TDFL indicates the positions of the clusters (addresses C1, C3, C4, C5) in which TDFL#1, TDFL#2, TDFL#3, and TDFL#4 are written. With such a construction, it is possible, during reproduction, to readout the TDFLs sequentially in a predetermined order onto the memory in the recording/reading apparatus 100, only by accessing the clusters in the TDMS in accordance with the positions indicated by the TDDS.

As described above, according to the present embodiment in which the order of reading TDFLs is indicated by TDFL position information, it is not necessary to arrange a plurality of TDFLs sequentially even if spare areas have a defective cluster. The TDFLs are arranged in discrete sequential areas including the defective cluster. That is to say, the present embodiment enables the TDFLs to be arranged randomly.

With this construction in which TDFLs can be arranged randomly, when only one defective cluster is detected while a plurality of TDFLs are written into a sequence of clusters in the TDMS, it is not necessary to retry writing all the plurality of TDFLs from the start, and only the TDFL failed to be written into the defective cluster is written into another cluster as a retry. Since this reduces the number of TDFLs to be written as a retry, it is possible to prevent the TDMS from being consumed rapidly.

Second Embodiment

The second embodiment proposes an arrangement of TDFLs in the TDMS to increase the speed of writing into the TDMS.

Figure 17:
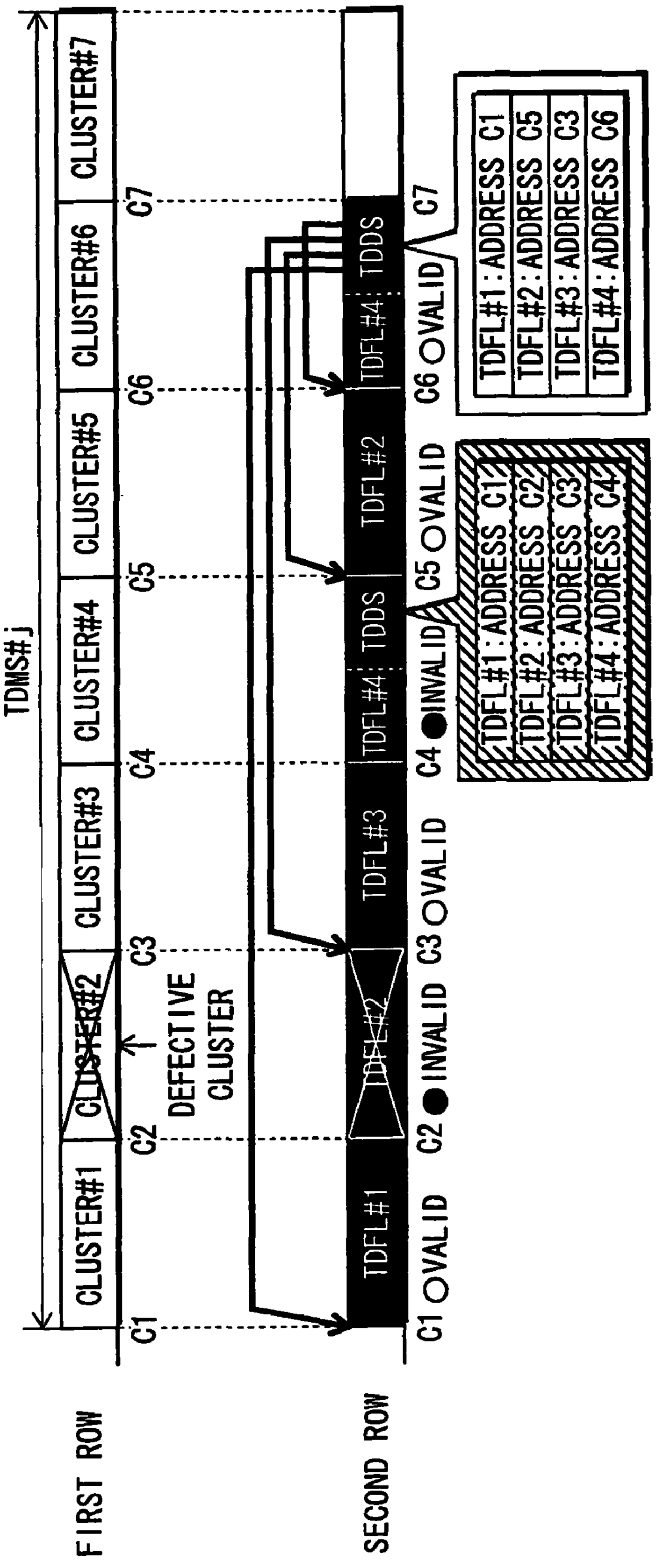
FIG. 17 shows an example of a discrete arrangement of TDFLs in the second embodiment.

FIG. 17 shows an example of a discrete arrangement of TDFLs in the second embodiment. The first row of FIG. 17 shows a plurality of clusters that constitute a TDMS. The second row shows four TDFLs (TDFL#1, TDFL#2, TDFL#3 and TDFL#4) and a TDDS written in these clusters.

In the second row, the TDFLs and TDDS are arranged in the order of TDFL#1, TDFL#3, TDFL#4, TDDS, TDFL#2, TDFL#4, and TDDS. There are two TDFL#4s and two TDDSs. Among these TDFL#4s and TDDSs, the TDFL#4 and TDDS recorded later are valid, and the TDFL#4 and TDDS having been recorded earlier are invalid. This is because only a TDDS that is immediately before the not-recorded area is made valid.

It would be understood that in TDMS#j shown in FIG. 17, TDFL#1 to TDFL#4 are arranged in the following order:

i) TDFLs written in the initial writing (TDFL#1, TDFL#3);

ii) TDFLs written as a retry (TDFL#2); and iii) the last TDFL (TDFL#4).

In each TDDS, a plurality of pieces of TDFL position information are arranged in the ascending order of the addresses of the defective areas indicated by the corresponding TDFLS.

In FIG. 17, cluster#2 is a defective cluster. Basically, TDFL#2, which failed to be written into the defective cluster, should be written in a normal cluster to follow TDFL#1. However, in this example, TDFL#2 is written, as a retry, in a cluster that is followed by a cluster in which TDFL#4 and TDDS are writ ten. Even if, as in this case, two TDFL#4s are arranged, and TDFL#2 is arranged in no particular order, the TDDS indicates the positions of the clusters (addresses C1, C5, C3, and C6) in which valid TDFL#1 to TDFL#4 are written in the order of TDFL#1, TDFL#2, TDFL#3, and TDFL#4. With such a construction, it is possible, during reproduction, to readout the TDFLs sequentially in a predetermined order onto the memory in the recording/reading apparatus 100, only by accessing the clusters in the TDMS in accordance with the positions indicated by the TDDS. As such, the improvement in the second embodiment regarding the optical disc is to allow not only a discrete arrangement of TDFLs, but also a redundant arrangement of TDFLs.

Up to now, the improvement in the second embodiment regarding the optical disc has been described. The following describes the recording/reading apparatus 100 in the second embodiment. The improvement in the recording/reading apparatus 100 of the second embodiment is achieved by the TDMS information writing unit 26, verifying unit 27, and position information generating unit 28.

The TDMS information writing unit 26 in the second embodiment writes all the TDFLs and TDDSs at once into the latest TDMS in the TDMA. If a cluster in which a TDFL has been written is a defective cluster, the TDMS information writing unit 26 writes the TDFL written in the defective cluster, the last TDFL, and the TDDS as a retry.

The verifying unit 27 in the second embodiment verifies the TDFLs written by the TDMS information writing unit 26 including the TDFLs written as a retry) to judge whether or not the TDFLs have been written correctly.

The position information generating unit 28 in the second embodiment, when the TDMS information writing unit 26 writes TDFLs (including a retry), generates TDFL position information to be stored in the TDDS.

Figure 18:
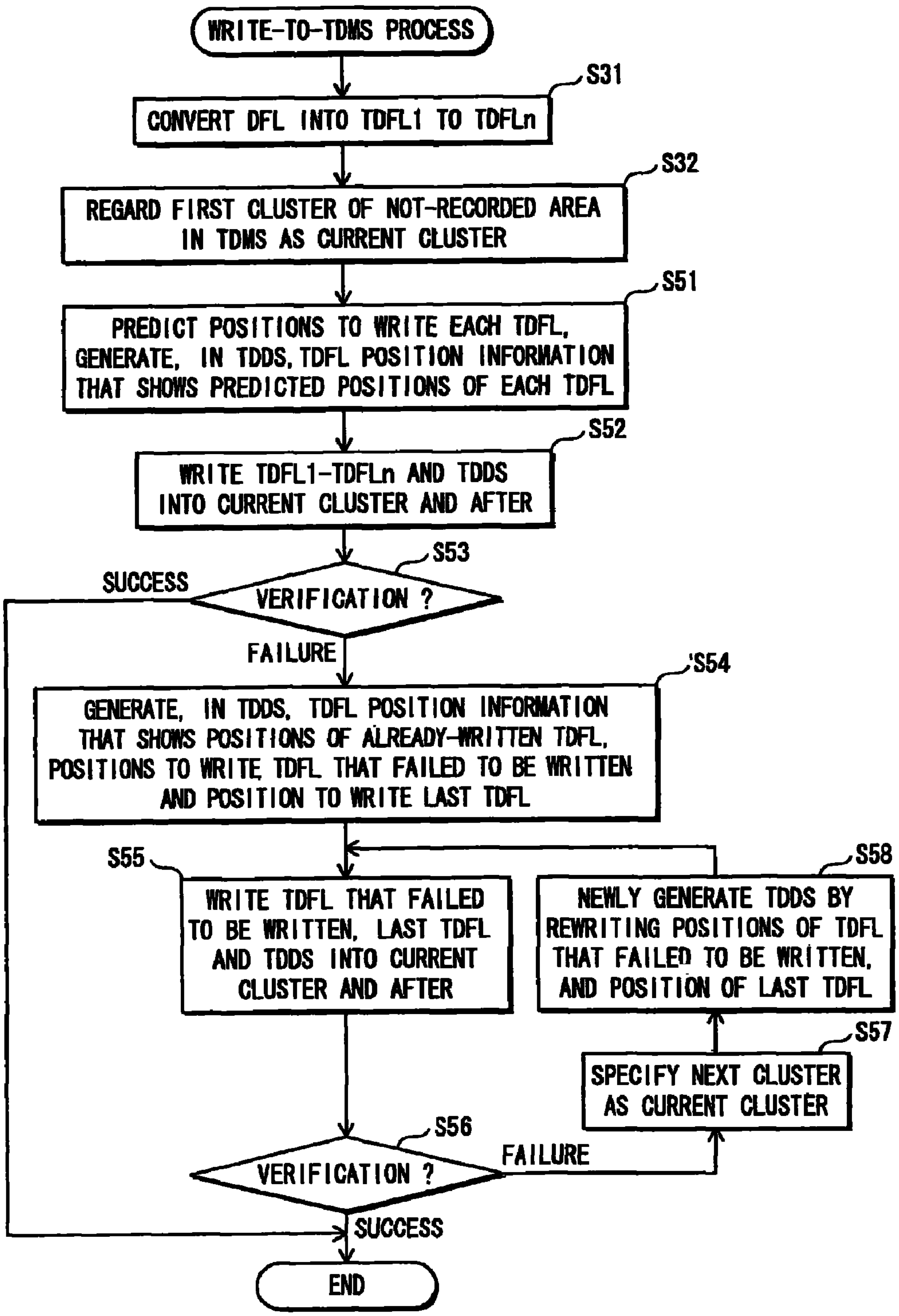
FIG. 18 is a flowchart showing the procedure of the write-to-TDMS process in the second embodiment.

The improvement achieved by the TDMS information writing unit 26, verifying unit 27, and position information generating unit 28 is disclosed in the flowchart shown in FIG. 18.

FIG. 18 is a flowchart showing the procedure of the write-to-TDMS process in the second embodiment. In this flowchart, after steps S31 and S32 are performed as in the flowchart of FIG. 15, steps S51 to S52 are performed.

In steps S51 to S52, the position information generating unit 28 generates in the TDDS the TDFL position information which indicates the positions of four clusters (starting with the current cluster) predicted to store a plurality of TDFLs, (step S51), and TDFL#L to TDFL#4 and TDDS are written into the current cluster and after (step S52). It should be noted here that by recording a sequence of TDFLs into a sequence of clusters, it is possible to reduce the wait time that occurs when the recording start position is searched for, and to reduce the time required for updating the TDMS.

In step S51, the position information generating unit 28 generates the TDFL position information based on the prediction that four TDFLs are writ ten in the current cluster and the succeeding clusters. Here, suppose that there are the k number of TDFLs, then any of the k number of TDFLs might be written as a retry, and the following relationship is used to detect the target of the retry:

TDFL position information of the $i^{th}$ TDFL ($i \leqq k$)

$$\leftarrow \text{current cluster}+(i-1)*\text{clusters}$$

In step S53, the verifying unit 27 verifies the results of the above-described writing of all TDFLs. If it is judged that all the TDFLs have been written correctly (Success in step S53), the process of this flowchart ends.

If a defective cluster is detected (Failure in step S53), the position information generating unit 28 generates in the TDDS the TDFL position information that shows positions of already-written TDFLs, positions to write TDFLs that failed to be written, and a position to write the last TDFL (step S54), then a loop composed of steps S55 to S58 is performed.

In this loop composed of steps S55 to S58, the TDMS information writing unit 26 makes a retry. In the example shown in FIG. 17, the targets of the retry are not only TDFL#2 failed to be written, but a new TDDS that indicates a new position of TDFL#2, and TDFL#4 to be written in the same cluster as the TDDS.

The steps S55 to S58 are performed as follows. The TDMS information writing unit 26 writes the TDFL that failed to be written, the last TDFL, and the TDDS, into the current cluster and the succeeding clusters (step S55). The verifying unit 27 verifies the clusters into which the data has been written (step S56). If the clusters into which the data has been written are not defective, the process ends. If the current cluster into which the data has been written is a defective cluster, the next cluster is specified as the current cluster (step S57). The position information generating unit 28 newly generates a TDDS by rewriting the position the TDFL that failed to be written, and the position of the last TDFL in the TDDS (step S58). The steps S55 and S56 are performed again.

In steps S54 and S58, the position information generating unit 28 generates or rewrites the TDFL position information as follows. In a retry of writing TDFLs, the targets of the retry are arranged in the TDMS in the following order: (1) one or more TDFLs; and (2) the last TDFL. As a result, the position information generating unit 28 rewrites the TDFL position information in the TDDS on presumption that the one or more TDFLs as the targets of the retry are written into the current cluster and the succeeding clusters. Here, suppose that the number of the one or more TDFLs as the targets of the retry is "k", the following relationships are used to detect the targets of the retry:

TDFL position information of the $i^{th}$ TDFL ($i \leqq k$)

$$\leftarrow \text{current cluster}+(i-1)^{*}\text{clusters; and}$$

TDFL position information of the last TDFL $$\leftarrow \text{current cluster}+(k-1)^{*}\text{clusters.}$$

Figure 19:
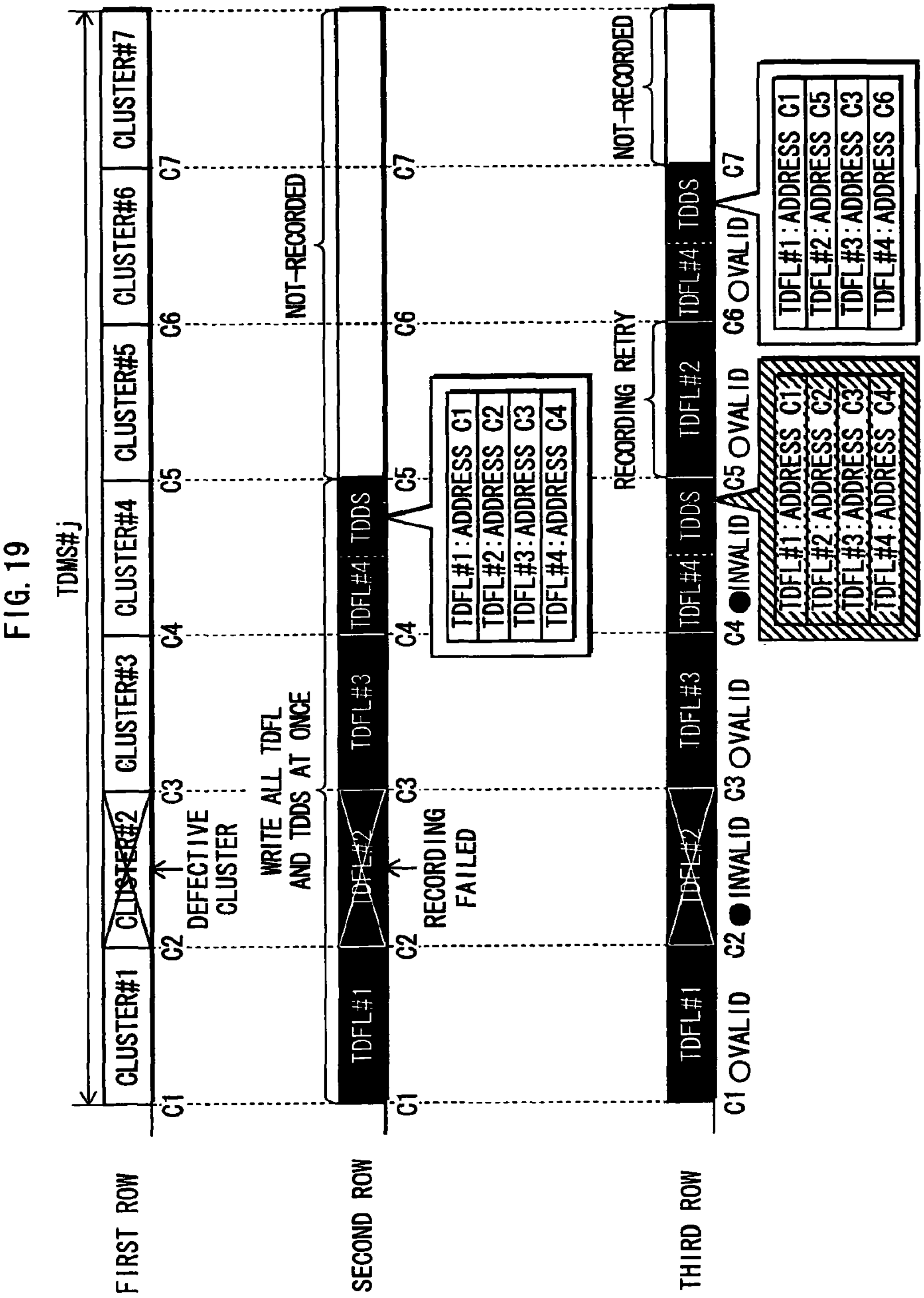
FIG. 19 shows the process in which TDFLs are written by the recording/reading apparatus 100 of the second embodiment.

FIG. 19 shows the process in which TDFLs are written by the recording/reading apparatus 100 of the second embodiment. The first row of FIG. 19 shows a plurality of clusters that constitute TDMS#j. The second and third rows show the process in which four TDFLs (TDFL#1, TDFL#2, TDFL#3 and TDFL#4) and a TDDS are written in these clusters. In the first row, cluster#2 is a defective cluster. The second row indicates the state in which TDFL#1-TDFL#4 and TDDS have been written in cluster#1-cluster#4. Here, the TDDS indicates the positions of the clusters (addresses C1, C2, C3, and C4) in which TDFL#1, TDFL#2, TDFL#3, and TDFL#4 have been written. A retry is required since, as described above, cluster#2 is a defective cluster. Here, the targets of the retry are not only TDFL#2 failed to be written, but a new TDDS that indicates a new position of TDFL#2, and TDFL#4 to be written in the same cluster as the TDDS. The third row indicates the state in which TDFL#2, TDFL#4, and TDDS have been written into cluster#5 and the succeeding clusters, as a result of the retry. The TDDS written together with the last TDFL indicates the positions of the clusters (addresses C1, C5, C3, and C6) in which TDFL#1, TDFL#2, TDFL#3, and TDFL#4 have been written. With such a construction, it is possible, during reproduction, to readout the TDFLs sequentially in a predetermined order onto the memory in the recording/reading apparatus 100, only by accessing the clusters in the TDMS in accordance with the positions indicated by the TDDS.

As described above, according to the second embodiment in which TDFLs that failed to be recorded due to a defect or the like, the last TDFL, and the TDDS are written as a retry, it is possible to reduce the time required to update the TDMS, improving the facility of use. Further, it is possible to reduce the risk of failure in updating TDMS which may occur, for example, if a power is turned off abruptly during the update.

Also, a defect such as a flaw in TDMA often involves a plurality of defective clusters that align in the radius direction. In the optical disc, one inner circumference approximately corresponds to two clusters. Accordingly, if the TDMS is composed of four clusters, and if always the same contents are tried to be written into the TDMS as a retry, there is a possibility that the update of the TDMS may repeatedly fail. However, according to the procedure of the second embodiment, if defective clusters align in the radius direction, TDFLs to be written into the defective clusters change for each retry. This increases the probability that a retry is performed successfully.

Third Embodiment

The third embodiment relates to an improvement that achieves a speed of writing that is approximately in the middle of those of the first and second embodiments.

Figure 20:
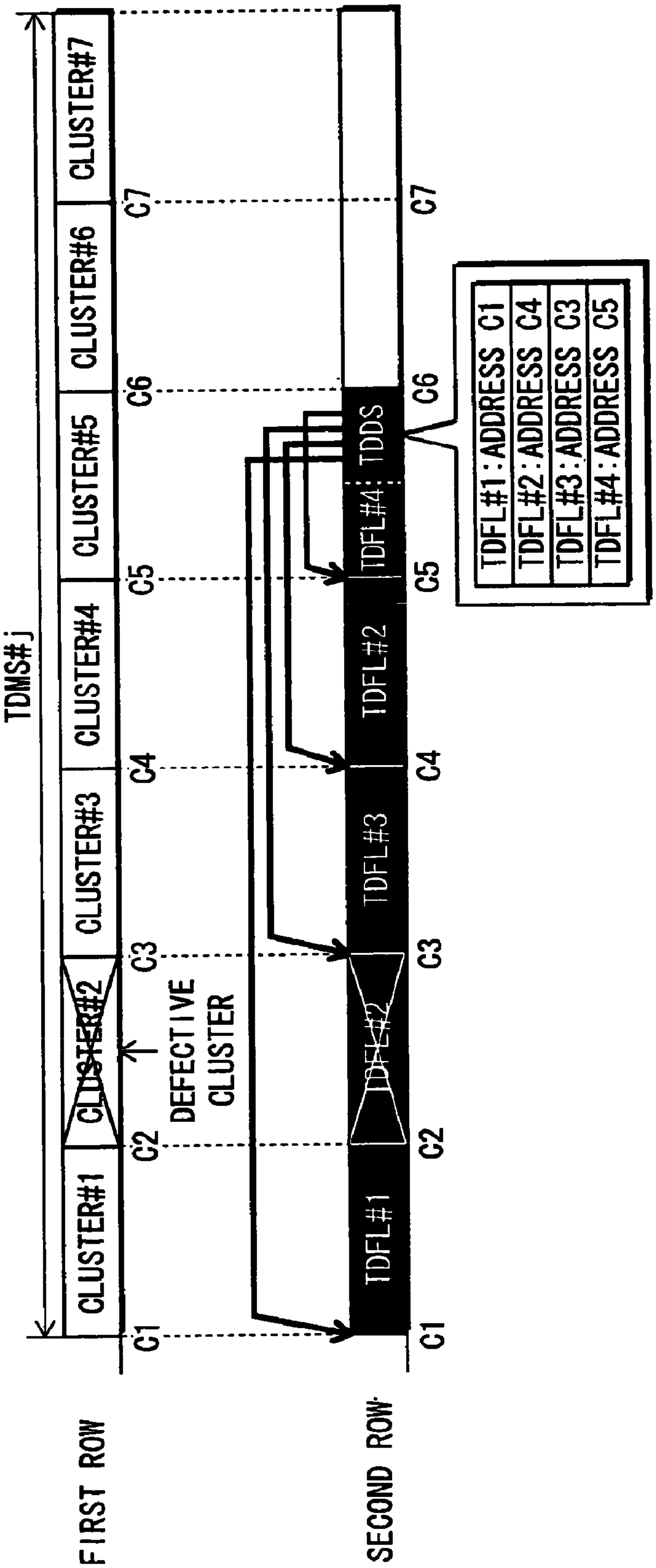
FIG. 20 shows an example of a discrete arrangement of TDFLs in the third embodiment.

FIG. 20 shows an example of a discrete arrangement of TDFLs in the third embodiment. The first row of FIG. 20 shows a plurality of clusters that constitute a TDMS. The second row shows four TDFLs (TDFL#1, TDFL#2, TDFL#3 and TDFL#4) and a TDDS written in these clusters.

In the second row, the TDFLs and TDDS are arranged in the order of TDFL#1, TDFL#3, TDFL#2, TDFL#4, and TDDS. In FIG. 20, cluster#2 is a defective cluster, and TDFL#2 written in the defective cluster is written in a cluster before TDFL#4 that is the last TDFL. It would be understood that TDFL#2 was written as a retry in a cluster before TDFL#4, the last TDFL. Even if, as in this case, TDFL#2 is arranged in no particular order, the TDDS indicates the positions of the clusters (addresses C1, C4, C3, and C5) in which TDFL#1, TDFL#2, TDFL#3, and TDFL#4 have been written in the order of TDFL#1 to TDFL#4. With such a construction, it is possible, during reproduction, to read out the TDFLs sequentially in a predetermined order onto the memory in the recording/reading apparatus 100, only by accessing the clusters in the TDMS in accordance with the positions indicated by the TDDS. As such, the improvement in the third embodiment regarding the optical disc is to allow a discrete arrangement of TDFLS.

As described above, in the optical disc 1 in the third embodiment, a plurality of pieces of TDFL position information are arranged in the TDDS in the ascending order of the defect entries, and only the start position information of the TDFLs that failed to be recorded due to a defect or the like are arranged to follow the plurality of pieces of TDFL position information, enabling the TDMS, which has a finite size, to be used efficiently.

Up to now, the improvement in the third embodiment regarding the optical disc has been described. The following describes the recording/reading apparatus 100 in the third embodiment. The improvement in the recording/reading apparatus 100 of the third embodiment is achieved by the TDMS information writing unit 26, verifying unit 27, and position information generating unit 28.

The TDMS information writing unit 26 in the third embodiment writes all the TDFLs, except for the last TDFL, at once into the latest TDMS in the TDMA. If a cluster in which a TDFL has been written is a defective cluster, the TDMS information writing unit 26 writes the TDFL written in the defective cluster, as a retry, then writes the last TDFL and the TDDS into the TDMS.

The verifying unit 27 in the third embodiment verifies the TDFLs written by the TDMS information writing unit 26 (including the TDFLs written as a retry) to judge whether or not the TDFLs have been written correctly.

The position information generating unit 28 in the third embodiment, when the TDMS information writing unit 26 writes TDFLs (including a retry), generates TDFL position information to be stored in the TDDS.

Figure 21:
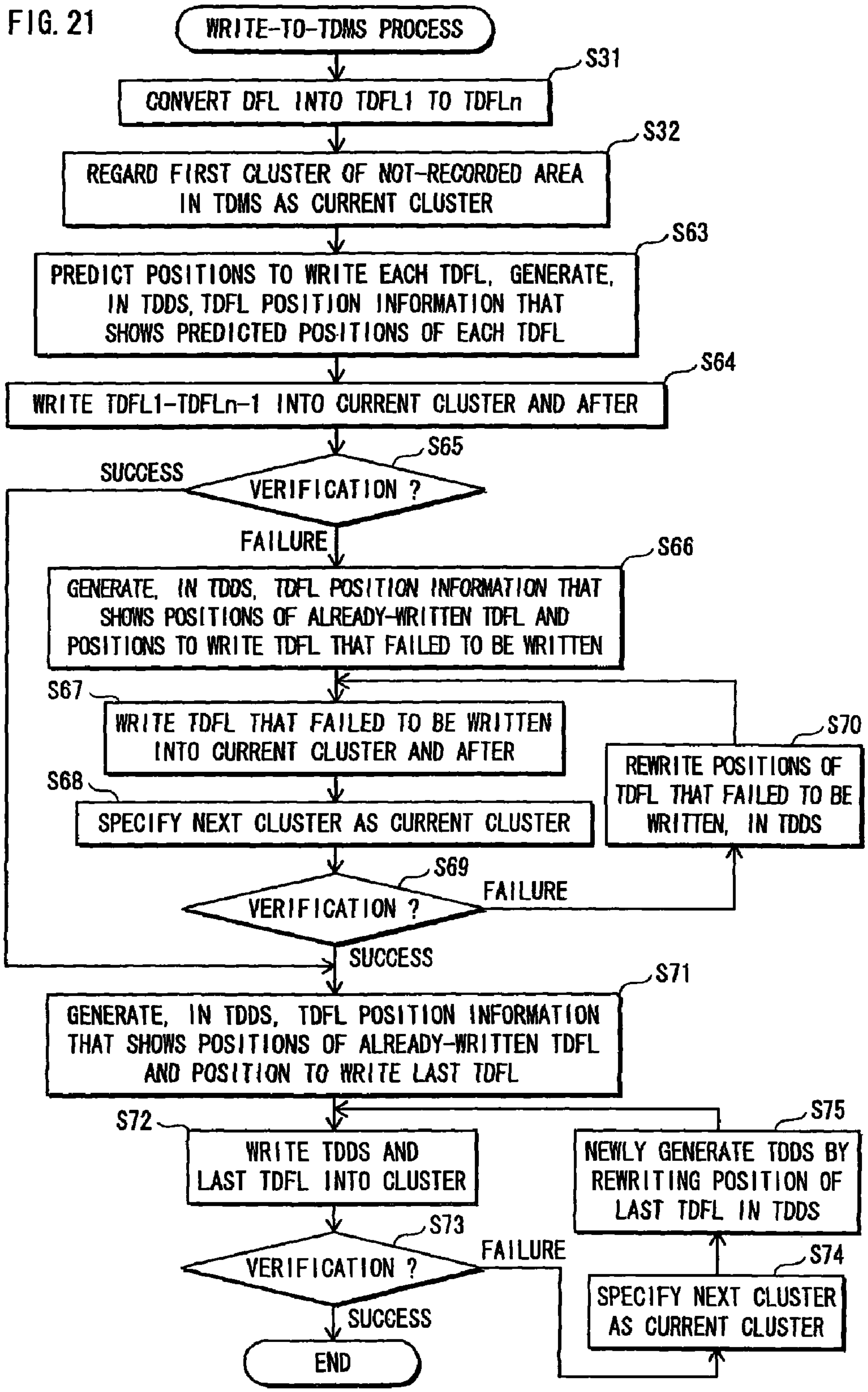
FIG. 21 is a flowchart showing the procedure of the write-to-TDMS process in the third embodiment.

The improvement achieved by the TDMS information writing unit 26, verifying unit 27, and position information generating unit 28 is disclosed in the flowchart shown in FIG. 21. The following describes the process performed by the TDMS information writing unit 26, verifying unit 27, and position information generating unit 28 of the third embodiment, with reference to the flowchart.

FIG. 21 is a flowchart showing the procedure of the write-to-TDMS process in the third embodiment. In this flowchart, after steps S31 and S32 are performed as in the flowchart of FIG. 15, steps S63 to S64 are performed.

In steps S63 to S64, the position information generating unit 28 generates in the TDDS the TDFL position information which indicates the positions of four clusters (starting with the current cluster) predicted to store a plurality of TDFLs, (step S63), and TDFL#1 to TDFL#n−1 are written into the current cluster and after (step S64).

In step S65, the verifying unit 27 verifies the results of the above-described writing of all TDFLs. If it is judged that all the TDFLs have been written correctly (Success in step S65), the process composed of steps S66 to S70 is skipped.

The steps S66 to S70 are performed if a defective cluster is detected. The position information generating unit 28 generates in the TDDS the TDFL position information that shows positions of already-written TDFLs, and positions to write TDFLs that failed to be written (step S66), then a loop composed of steps S67 to S70 is performed.

The steps S67 to S70 are performed as follows. The TDMS information writing unit 26 writes the TDFLs that failed to be written into the current cluster and the succeeding clusters (step S67). The next cluster is specified as the current cluster (step S68). The verifying unit 27 verifies the clusters into which the data has been written (step S69). If the clusters into which the data has been written are not defective, the control goes out of the loop to step S71. If the current cluster into which the data has been written is a defective cluster, the position information generating unit 28 rewrites the position information of the TDFLs that failed to be written, in the TDDS (step S70). The control then moves to step S67 again.

In step S70, the position information generating unit 28 rewrites the TDFL position information as follows. In a retry of writing TDFLs, the position information generating unit 28 rewrites the TDFL position information in the TDDS on presumption that one or more TDFLs as the targets of the retry are written into the current cluster and the succeeding clusters. Here, suppose that the number of the one or more TDFLs as the targets of the retry is "k", the following relationships are used to detect the targets of the retry:

TDFL position information of the $i^{th}$ TDFL ($i \leqq k$)

$$\leftarrow \text{current cluster} + (i-1)^{*}\text{clusters}.$$

The steps S71 to S75 are performed as follows. The position information generating unit 28 generates in the TDDS the TDFL position information that shows positions of already-written TDFLs, and the position to write the last TDFL at (step S71), then a loop composed of steps S72 to S75 is performed.

The loop is performed as follows. That is to say, the TDMS information writing unit 26 writes the generated TDDS and the last TDFL into the current cluster (step S72), and the verifying unit 27 verifies the cluster in which the data was written (step S73). If the cluster is not defective, the process ends. If the cluster is defective, the next cluster is specified as the current cluster (step S74). The position information generating unit 28 then newly generates a TDDS by rewriting the position of the last TDFL in the TDDS (step S75). The steps S72 and S73 are then performed again.

The rewriting of the TDFL position information by the position information generating unit 28 in step S75 is achieved by writing the address of the current cluster into the TDFL position information of the last TDFL.

Figure 22:
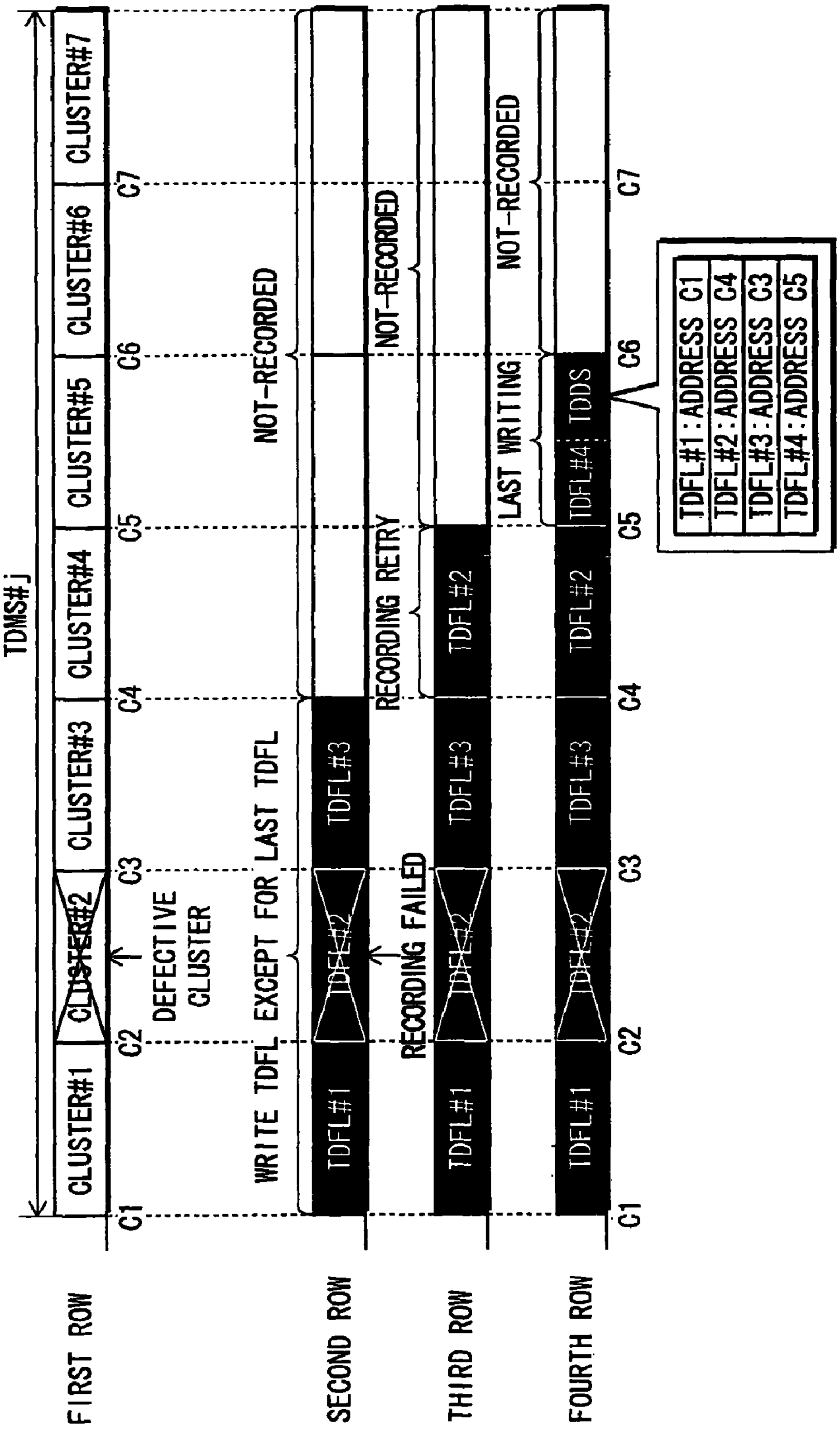
FIG. 22 shows how the recording/reading apparatus 100 of the third embodiment writes the TDFLs.

FIG. 22 shows how the recording/reading apparatus 100 of the third embodiment writes the TDFLs. The first row of FIG. 22 shows a plurality of clusters that constitute TDMS#j. The second to fourth rows show four TDFLs (TDFL#1, TDFL#2, TDFL#3, and TDFL #4) and a TDDS written in these clusters. It is presumed that cluster#2 shown in the first row is a defective cluster, and that the second row shows the state in which TDFL#1 to TDFL#3 have been written in cluster#1 to cluster#3.

As described above, cluster#2 is a defective cluster. Therefore, a retry is required. In this retry, only TDFL#2, which failed to be written in the initial writing, is written. However, at the same time, TDFL#4 being the last TDFL and the TDDS are written all at once. The second row indicates the state in which TDFL#2 has been written as a retry, and the fourth row indicates the state in which TDFL#4 and TDDS have been written. The TDDS written together with the last TDFL indicates the positions of the clusters (addresses C1, C4, C3, C5) in which TDFL#1, TDFL#2, TDFL#3, and TDFL#4 are written. With such a construction, it is possible, during reproduction, to read out the TDFLs sequentially in a predetermined order onto the memory in the recording/reading apparatus 100, only by accessing the clusters in the TDMS in accordance with the positions indicated by the TDDS.

As described above, according to the third embodiment in which TDFLs that failed to be recorded due to a defect or the like, the last TDFL, and the TDDS are written as a retry, it is possible to reduce the time required to update the TDMS, improving the facility of use. Further, it is possible to reduce the risk of failure in updating TDMS which may occur, for example, if a power is turned off abruptly during the update.

Also, a defect such as a flaw in TDMA often involves a plurality of defective clusters that align in the radius direction. In the optical disc, one inner circumference approximately corresponds to two clusters. Accordingly, if the TDMS is composed of four clusters, and if always the same contents are tried to be written into the TDMS as a retry, there is a possibility that the update of the TDMS may repeatedly fail. However, according to the procedure of the third embodiment, if defective clusters align in the radius direction, TDFLs to be written into the defective clusters change for each retry. This increases the probability that a retry is performed successfully.

<Supplementary Notes>

Up to now, the best mode for carrying out the invention, as far as known to the applicant at this time of filing the present application, has been described. However, further improvements or modifications can be made on the present invention in terms of the following technical topics. It should be noted here that whether or not to make such improvements or modifications is optional, and depends on the implementer of the invention.

<Construction of TDMS>

In the above-described embodiments, the TDMS is composed of TDFLs and TDDSs. However, other information may be added to the TDMS. In that case, a TDMS is equivalent, in size, to the total of the TDFLs, TDDSs, and the additional information constituting the TDMS.

<TDDS>

The TDDS may not necessarily be the same as the DDS in size. It will naturally be understood that when the total of TDFLs, TDDSs, and other meaningful information does not reach a cluster in size, the remaining portion of the cluster is filled with such data that is not meaningful, such as "0".

<Application to Other Lists>

In the first embodiment, the TDFL is explained. However, it will naturally be understood that the T-DFL, as a target of the present invention, may be replaced with another list that, for example, is composed of replacement source entries and replacement destination entries, where data A to overwrite data B in a recorded area is recorded in another area, and an entry is used to virtually overwrite.

<Updating TDMS>

In the first embodiment, if a new addition of a defect entry affects only TDFLs that constitute part of a TDMS, only the affected part of the TDMS, not the whole TDMS, may be updated.

<Finalizing Indication Flag>

The DMA information reading unit 21 has a function to judge the 1$^{st}$ DMA to the 4$^{th}$ DMA whether or not the disc has been finalized. However, if a finalizing indication flag, which indicates whether or not the disc has been finalized, is provided at a predetermined position in the TDMS, the TDMS information reading unit 22 can judge, using the flag, whether or not the disc has been finalized. The finalizing indication flag does not necessarily be included in the TDMS, but may be provided at any predetermined position in the medium.

<Conversion from TDFL to DFL>

In the above describe embodiments, TDFLs are read out from a plurality of clusters on a one-cluster-to-one-cluster basis in an order indicated by the TDFL position information, and are stored in the storage buffer 16. However, not limited to this, after TDFLs are read out from all the clusters ranging from the one at the position indicated by the TDFL#1 position information to the last cluster in the recorded area, only valid TDFLs corresponding to the positions indicated by the TDFL position information are extracted, and the extracted TDFLs may be arranged in an order indicated by the TDFL position information.

<Reading TDFLs>

In the above describe embodiments, TDFLs are read out from a plurality of clusters on a one-cluster-to-one-cluster basis in an order indicated by the TDFL position information, and are stored in the storage buffer 16. However, not limited to this, it may be judged from the continuity of pieces of TDFL position information whether or not any defective clusters or invalid clusters are included in the clusters in which the TDFLs corresponding to the positions indicated by the TDFL position information are recorded, and if TDFLs are recorded in valid clusters in succession, the valid TDFLs may be read out in succession from the clusters. This construction reduces the time required to obtain defect entries, compared with the case where TDFLs are read out from a plurality of clusters on a one-cluster-to-one-cluster basis.

<Conversion from TDFL to DFL>

In the storage buffer 16, a combination of all the read-out TDFLs may be stored as DFL, or the read-out TDFLs may be stored as they are.

<Updating TDMS>

The update of the TDMS performed by the TDFL conversion unit 25 in the first embodiment is merely an example. The update may be performed differently in so far as information regarding defects is reflected. For example, sorting the defect entries may not necessarily be performed.

<Construction of TDMS>

In the above-described embodiments, the TDMS is composed of TDFLs and TDDSs. However, other information may be added to the TDMS. In that case, a TDMS is equivalent, in size, to the total of the TDFLs, TDDSs, and the additional information constituting the TDMS.

<Timing of Verifying>

In the second and third embodiments, after TDFLs including those that failed to be written in the initial writing due to a defective cluster are written and the last TDFL and the TDDS are written, the verification is performed. However, not limited to this, for example, a process, in which only TDFLs that failed to be written due to a defective cluster are written and a verification is performed, may be repeated until all the TDFLs except for the last TDFL are successfully written, and then the last TDFL and the TDDS may be written and a verification may be performed.

<Occurrence of Error During Recording>

In the second and third embodiments, if it is judged during the verification that a recording failure occurred, the recording is performed as a retry. However, not limited to this, for example, a retry may be performed as an error occurs during writing of data. In this case, the following process may be repeated to obtain the same advantageous effects: if an error occurs during writing of data, clusters in which data has been written in succession are verified, TDFLs including those that failed to be written, and the last TDFL and the TDDS are written, and a verification is performed.

<Updating TDMS>

In the third embodiment, if a new addition of a defect entry affects only TDFLs that constitute part of a TDMS, only the affected part of the TDMS, not the whole TDMS, may be updated.

<Rewriting TDDS>

In the second embodiment, before a retry is made, each piece of TDFL position information corresponding to each TDFL is obtained and the TDFL position information in the TDDS is rewritten with the obtained TDFL position information. However, the TDFL position information in the TDDS may not necessarily be rewritten before a retry is made. For example, each piece of TDFL position information corresponding to each valid TDFL may be obtained when the last TDFL and the TDDS are written, and the TDFL position information in the TDDS may be rewritten with the obtained TDFL position information.

<Timing of Verifying>

In the third embodiment, a process, in which the verification is performed after TDFLs including those that failed to be written are written normally, is repeated until all the TDFLs except for the last TDFL and the TDDS are written normally, and then after the last TDFL and the TDDS are written, the verification is performed. However, TDFLs that failed to be written and the TDDS may be written into clusters that align in sequence, and then the verification may be performed.

<Timing of Verifying>

In the third embodiment, a process, in which the verification is performed after TDFLs including those that failed to be written are written normally, is repeated until all the TDFLs except for the last TDFL and the TDDS are written normally, and then after the last TDFL and the TDDS are written, the verification is performed. However, process A, in which a TDFL that failed to be written is written and the verification is performed, may be repeated until all the TDFLs except for the last TDFL are written normally, and then process B, in which after the last TDFL and the TDDS are written, the verification is performed, may be performed. The sequence of processes A and B may be repeated.

<Order of TDFLs>

Even in the case where a defective cluster is included in the clusters, the order of valid TDFL#1 to TDFL#n may be an ascending order. For example, the cluster in which TDFL#n was written is a defective cluster, the TDFLs are written in the order of TDFL#1, TDFL#2, TDFL#3, . . . [defective cluster], TDFL#n, which is an ascending order.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

■Production of Program of Present Invention

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

■Use of Program of Present Invention

The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the recording/reading apparatus 100 as the instruction ROM is embedded in the control unit and is executed by the CPU.

(ii) Used as Application

When the recording/reading apparatus 100 is a hard-disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the recording/reading apparatus 100.

In this case, only the load module is supplied to the recording/reading apparatus 100 via a transportable recording medium and/or a network, and is installed in the hard disk as one application. This enables the recording/reading apparatus 100 to perform the bootstrapping by the boot ROM to activate an operation system, and then causes the CPU to execute the installed load module as one application so that the program of the present application can be used.

As described above, when the recording/reading apparatus 100 is a hard-disk-embedded model, the program of the present invention can be used as one application. Accordingly, it is possible to transfer, lend, or supply, via a network, the program of the present invention separately.

<Defect Management Information Processing Unit 13>

The defect management information processing unit 13 described above in the embodiments can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the recording/reading apparatus 100.

The bear chip packaged in the system LSI includes a front-end unit, a back-end unit, and a digital processing unit. The front-end unit digitizes analog signals. The back-end unit converts digital data obtained through digital processes into the analog format and outputs the analog data.

The internal-structure components shown in the above-described embodiments are implemented in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the recording/reading apparatus 100 described in each embodiment above.

It should be noted here that although the term LSI is used here, it may be called IC, LSI, super LSI, ultra LSI or the like, depending on the level of integration.

Further, part or all of the components of each recording/reading apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

INDUSTRIAL APPLICABILITY

The optical disc, recording apparatus, and reading apparatus of the present invention can be mass-produced based on the internal structures of them shown in the embodiments above. As such, the optical disc, recording apparatus, and reading apparatus of the present invention has the industrial applicability.

The invention claimed is:

1. A write-once optical disc onto which data is recorded in units of clusters, the write-once optical disc comprising:

a user data area having at least one defective area, and a temporary defect management area including one or more data structures for updating defect management, and each data structure performs update separately, wherein each of the data structures includes at least one not-defective cluster in which a defective area list and structure information are included, the defective area list includes entries for the at least one defective area in the user data area of the optical disc, the entries in the defective area list of each data structure have been sorted in accordance with information of defective areas , the structure information is arranged in a last cluster of each data structure, and the structure information includes plural pieces of position information that indicate positions of clusters each of which constitutes a part of the defective area list.

2. The optical disc of claim 1, wherein the data structure is composed of a plurality of clusters including a defective cluster, the defective area list is written into clusters such that the defective area list is divided into a first area of clusters preceding the defective cluster and a second area of clusters succeeding the defective cluster, and a first piece of position information that indicates a last cluster in the first area is, in the structure information, adjacent to a second piece of position information that indicates a starting cluster in the second area.

3. A recording apparatus for writing a defective area list onto a write-once optical disc onto which data is recorded in units of clusters, the optical disc including a data user area having at least one defective area, the recording apparatus comprising:

a generating unit configured to generate the defective area list and structure information; and a writing unit configured to write a data structure, which includes the generated defective area list and structure information, into at least one cluster in a temporary defect management area, wherein the defective area list includes entries for the at least one defective area in the user data area of the optical disc, the structure information is arranged in a last cluster among clusters of the data structure, and the structure information includes plural pieces of position information that indicate positions of clusters each of which constitutes a part of the defective area list, when the structure is updated, the generating unit sorts entries in the defective area list in the data structure in accordance with information of defective areas, and the data structure written into said at least one cluster in the temporary defect management area by the writing unit is composed of clusters that are not defective.

4. The recording apparatus of claim 3 further comprising a verifying unit configured to verify whether or not a cluster A into which a defective area list was written is a defective cluster, wherein if the cluster A is verified to be a defective cluster, the writing unit performs a retry to write the defective area list into a cluster B that succeeds in position the cluster A, during the retry, the defective area list is written such that the defective are list is divided into a first area of clusters preceding the defective cluster and a second area of clusters succeeding the defective cluster, and the generating unit arranges a first piece of position information that indicates a last cluster in the first area and a second piece of position information that indicates a starting cluster in the second area, in the structure information such that the first piece of position information is adjacent to the second piece of position information.

5. A reading apparatus for reading a defective area list from a temporary defect management area included in a write-once optical disc onto which data is recorded in units of clusters, the optical disc including a data user area having at least one defective area, wherein one or more data structures for updating defect management are recorded in the temporary defect management area, and each data structure performs update separately, each of the data structures includes a defective area list and structure information, each defective area list includes entries for the at least one defective area in the user data area of the optical disc, the entries in the defective area list of the data structure have been sorted in accordance with information of defective areas, the structure information is arranged in a last cluster among clusters of the data structure, and the structure information includes plural pieces of position information that indicate positions of clusters each of which constitutes a part of the defective area list, the reading apparatus comprising:

a reading unit configured to extract the structure information from the last cluster of the data structure and read out the defective area list from the optical disc onto a memory in accordance with the plural pieces of position information;

a holding unit configured to hold the defective area list read out onto the memory; and an accessing unit configured to, if a high-order apparatus has instructed to access a defective area that is indicated by the defective area list, access a spare area corresponding to the defective area, in place of the defective area.

6. A recording method for writing a defective area list onto a write-once optical disc onto which data is recorded in units of clusters, the optical disc including a data user area having at least one defective area, the recording method comprising:

generating the defective area list and structure information; and writing a data structure, which includes the generated defective area list and structure information, into a temporary defect management area, wherein the defective area list includes entries for the at least one defective area in the user data area of the optical disc, the structure information is arranged in a last cluster among clusters of the data structure, and the structure information includes plural pieces of position information that indicate positions of clusters each of which constitutes a part of the defective area list, when the data structure is updated, said generating sorts entries in the defective area list in the data structure in accordance with information of defective areas, and the data structure written into said at least one cluster in the temporary defect management area in said writing is composed of clusters that are not defective.

7. The recording method of claim 6 further comprising:

verifying whether or not a cluster A into which a defective area list was written is a defective cluster, wherein if the cluster A is verified to be a defective cluster, said writing performs a retry to write the defective area list into a cluster B that succeeds in position the cluster A, during the retry, the defective area list is written such that the defective area list is divided into a first area of clusters preceding the defective cluster and a second area of clusters succeeding the defective cluster, and said generating arranges a first piece of position information that indicates a last cluster in the first area and a second piece of position information that indicates a starting cluster in the second area, in the structure information such that the first piece of position information is adjacent to the second piece of position information.

8. A reading method for reading a defective area list from a temporary defect management area included in a write-once optical disc onto which data is recorded in units of clusters, the write-once optical disc including a data user area having at least one defective area, wherein one or more data structures for updating defect management are recorded in the temporary defect management area, and each data structure performs update separately, each of the data structures includes a defective area list and structure information, the defective area list includes entries for the at least one defective area in the user data area of the optical disc, the entries included in the defective area list of each data structure have been sorted in accordance with information of defective areas, the structure information is arranged in a last cluster among clusters of the structure, and the structure information includes plural pieces of position information that indicate positions of clusters each of which constitutes a part of the defective area list, the reading method comprising:

extracting the structure information from the last cluster of the data structure and reading out the defective area list from the optical disc onto a memory in accordance with plural pieces of position information;

holding the defective area list read out onto the memory; and accessing, if a high-order apparatus has instructed to access a defective area that is indicated by the defective area list, a spare area corresponding to the defective area, in place of the defective area.

* * * * *